United States Patent
Bittar

(10) Patent No.: US 7,019,528 B2
(45) Date of Patent: Mar. 28, 2006

(54) ELECTROMAGNETIC WAVE RESISTIVITY TOOL HAVING A TILTED ANTENNA FOR GEOSTEERING WITHIN A DESIRED PAYZONE

(75) Inventor: Michael S. Bittar, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 10/616,429

(22) Filed: Jul. 9, 2003

(65) Prior Publication Data

US 2004/0027131 A1   Feb. 12, 2004

Related U.S. Application Data

(60) Division of application No. 10/255,048, filed on Sep. 25, 2002, now Pat. No. 6,911,824, which is a division of application No. 09/615,501, filed on Jul. 13, 2000, now Pat. No. 6,476,609, which is a continuation-in-part of application No. 09/238,832, filed on Jan. 28, 1999, now Pat. No. 6,163,155.

(51) Int. Cl.
  G01V 3/08   (2006.01)
  G01V 3/10   (2006.01)
  G01V 3/12   (2006.01)
(52) U.S. Cl. .................... 324/337; 324/339
(58) Field of Classification Search ............ 324/332, 324/334, 336, 338, 340, 333, 335, 337, 339, 324/341, 342, 343; 175/50; 702/7
See application file for complete search history.

(56) References Cited

U.S. PATENT DOCUMENTS 3,014,177 A  12/1961 Hungerford et al. .......... 324/8
3,187,252 A  6/1965 Hungerford ............... 324/6
3,510,757 A  5/1970 Huston (Continued)

FOREIGN PATENT DOCUMENTS

EP   92402243.7   8/1992

(Continued)

OTHER PUBLICATIONS

Zhu, T. and L. Brown, "Two-dimensional Velocity Inversion and Synthetic Seismogram Computation," GEOPHYSICS, vol. 52, No. 1, Jan. 1987; p. 37-49.
Bittar, M. and P. Rodney, "The Effects of Rock Anisotropy on MWD Electromagnetic Wave Resistivity Sensors," The Log Analyst, Jan.-Feb. 1996, p. 20-30.

(Continued)

Primary Examiner—Bot Ledynh
Assistant Examiner—Kenneth J. Whittington
(74) Attorney, Agent, or Firm—Conley Rose, P.C.

(57) ABSTRACT

A method and apparatus for use within a borehole for simultaneously determining the horizontal resistivity, vertical resistivity, and relative dip angle for anisotropic earth formations. An antenna configuration in which a transmitter antenna and a receiver antenna are oriented in non-parallel planes such that the vertical resistivity and the relative dip angle are decoupled. Preferably, either the transmitter or the receiver is mounted in a conventional orientation in a first plane that is normal to the tool axis, and the other antenna is mounted in a second plane that is not parallel to the first plane. Also included are a method and apparatus for steering a downhole tool during a drilling operation in order to maintain the borehole within a desired earth formation. The steering capability is enabled by computing the difference or the ratio of the phase-based or amplitude-based responses of the receiver antennas which are mounted in planes that are not parallel to the planes of the transmitter antennas.

14 Claims, 27 Drawing Sheets

U.S. PATENT DOCUMENTS

| | | | | |
|---|---|---|---|---|
| 3,539,911 | A | * 11/1970 | Hopkinson et al. | 324/343 |
| 3,808,520 | A | 4/1974 | Runge | 324/6 |
| 4,302,722 | A | 11/1981 | Gianzero | 324/339 |
| 4,536,714 | A | 8/1985 | Clark | 324/338 |
| 4,636,731 | A | * 1/1987 | Savage et al. | 324/338 |
| 4,651,101 | A | 3/1987 | Barber et al. | 324/339 |
| 4,780,857 | A | 10/1988 | Lyle et al. | 367/35 |
| 4,808,929 | A | 2/1989 | Oldigs | 324/339 |
| RE32,913 | E | 4/1989 | Clark | 324/338 |
| 4,873,488 | A | 10/1989 | Barber et al. | 324/339 |
| 4,940,943 | A | 7/1990 | Bartel et al. | 324/338 |
| 4,962,490 | A | 10/1990 | Lyle et al. | 367/35 |
| 4,980,643 | A | 12/1990 | Gianzero et al. | 324/339 |
| 5,200,705 | A | 4/1993 | Clark et al. | 324/338 |
| 5,210,495 | A | * 5/1993 | Hapashy et al. | 324/338 |
| 5,230,386 | A | 7/1993 | Wu et al. | 175/45 |
| 5,241,273 | A | * 8/1993 | Luling | 324/338 |
| 5,278,507 | A | 1/1994 | Bartel et al. | 324/338 |
| 5,329,448 | A | 7/1994 | Rosthal | 364/422 |
| 5,389,881 | A | 2/1995 | Bittar et al. | 324/338 |
| 5,508,616 | A | * 4/1996 | Sato et al. | 324/343 |
| 5,530,358 | A | 6/1996 | Wisler et al. | 324/338 |
| 5,550,473 | A | 8/1996 | Klein | 324/338 |
| 5,656,930 | A | 8/1997 | Hagiwara | 324/339 |
| 5,757,191 | A | 5/1998 | Gianzero | 324/339 |
| 5,886,526 | A | 3/1999 | Wu | 324/338 |
| 6,044,325 | A | 3/2000 | Chakravarthy et al. | 702/7 |
| 6,181,138 | B1 | 1/2001 | Hagiwara et al. | 324/338 |
| 6,304,086 | B1 | * 10/2001 | Minerbo et al. | 324/338 |

FOREIGN PATENT DOCUMENTS

EP            97118854.5        10/1997

OTHER PUBLICATIONS

Hagiwara, T., "A New Method to Determine Horizontal-Resistivity in Anisotropic Formations without Prior Knowledge of Relative Dip," 37th SPWLA Annual Logging Symposium, New Orleans, LA, Jun. 16-19, 1996, p. 1-5 and three pages of figures.

Bittar, M., P. Rodney, S. Mack, and R. Bartel, "A True Multiple Depth of Investigation Electromagnetic Wave Resistivity Sensor: Theory, Experiment and Prototype Field Test Results," SPE 22705, 66th Annual Technical Conference and Exhibition of the Society of Petroleum Engineers, Dallas, TX, Oct. 6-9, 1991, p. 1-8 and ten pages of figures.

Mack, S., P. Rodney, and M. Bittar, "MWD tool accurately measures four resistivities," reprint from Oil & Gas Journal, week of May 25, 1992, p. 1-5.

Bittar, M., P. Rodney, and W. Hendricks, "Invasion Profiling With a Multiple Depth of Investigation Electromagnetic Wave Resistivity Sensor," SPE 28425, 69th Annual Technical Conference and Exhibition of the Society of Petroleum Engineers, New Orleans, LA, Sep. 25-28, 1994, p. 1-12 and eleven pages of figures.

Luling, M.G., R. Rosthal, and F. Shray, "Processing and Modeling 2-MHz Resistivity Tools in Dipping, Laminated Anisotropic Formations," SPWLA 35th Annual Logging Symposium, Jun. 19-22, 1994, p. 1-25.

Bonner, et al, "A New Generation of Electrode Resistivity Measurements for Formation Evaluation While Drilling," SPWLA 35th Annual Logging Symposium, Jun. 19-22, 1994.

* cited by examiner

US 7,019,528 B2

ELECTROMAGNETIC WAVE RESISTIVITY TOOL HAVING A TILTED ANTENNA FOR GEOSTEERING WITHIN A DESIRED PAYZONE

This application is a Divisional of U.S. application Ser. No. 10/255,048 filed Sep. 25, 2002, now U.S. Pat. No. 6,911,824 which is a Divisional of U.S. application Ser. No. 09/615,501, filed Jul. 13, 2000, now U.S. Pat. No. 6,476,609, issued Nov. 5, 2002, which is a Continuation-in-part of U.S. application Ser. No. 09/238,832 filed Jan. 28, 1999, now U.S. Pat. No. 6,163,155, issued Dec. 19, 2000.

BACKGROUND OF THE INVENTION

1. Field of the Invention

This invention relates generally to a method and apparatus for determining the horizontal and vertical resistivities and the relative dip angle of a borehole in an electrically anisotropic earth formation. More specifically, this invention relates to an electromagnetic wave induction technique for measuring resistivity using a tool having an antenna that is disposed within a plane which is inclined with respect to a plane that is normal to the axis of the tool. This invention also relates to a method and apparatus for steering a downhole tool during a drilling operation in order to maintain the borehole within a desired earth formation.

2. Description of the Related Art

In the field of petroleum well drilling and logging, electromagnetic wave resistivity sensors are frequently used to provide an indication of the electrical resistivity of rock formations surrounding an earth borehole. Such information regarding resistivity is useful in ascertaining the presence or absence of hydrocarbons. A typical electromagnetic wave resistivity tool comprises a transmitter antenna and a pair of receiver antennas located at different distances from the transmitter antenna along the axis of the tool. The transmitter antenna is used to transmit electromagnetic waves into the surrounding formation. In turn, the magnetic field in the formation induces an electrical voltage in each receiver antenna. Due to geometric spreading and absorption by the surrounding earth formation, the induced voltages in the two receiving antennas have different phases and amplitudes. Experiments have shown that the phase difference ($\Phi$) and amplitude ratio (attenuation, A) of the induced voltages in the receiver antennas are indicative of the resistivity of the formation. The point in the formation (as defined by a radial distance from the tool axis) to which such a resistivity measurement pertains is a function of the frequency of the transmitter and the distance from the transmitter to the mid-point between the two receivers. Thus, one may achieve multiple radial depths of investigation of resistivity either by providing multiple transmitters at different distances from the receiver pair or by operating a single transmitter at multiple frequencies.

If a formation is electrically isotropic, the resistivities measured at the various depths of investigation by such an electromagnetic wave resistivity tool will be the same. However, if the resistivities corresponding to the various depths of investigation are different, such differences indicate that the formation being measured is electrically anisotropic. In electrically anisotropic formations, the anisotropy is generally attributable to extremely fine layering during the sedimentary build-up of the formation. Hence, in a formation coordinate system oriented such that the x-y plane is parallel to the formation layers and the z axis is perpendicular to the formation layers, resistivities $R_x$ and $R_y$ in directions x and y, respectively, are the same, but resistivity $R_z$ in the z direction is different from $R_x$ and $R_y$. Thus, the resistivity in a direction parallel to the plane of the formation (i.e., the x-y plane) is known as the horizontal resistivity, $R_h$, and the resistivity in the direction perpendicular to the plane of the formation (i.e., the z direction) is known as the vertical resistivity, $R_v$. The index of anisotropy, $\alpha$, is defined as $\alpha = [R_v/R_h]^{1/2}$.

The relative dip angle, $\theta$, is the angle between the borehole axis (tool axis) and the normal to the plane of the formation. If the axis of an electromagnetic wave resistivity tool is perpendicular to the plane of an anisotropic formation (i.e., $\theta=0°$), both the phase shift and amplitude attenuation measurements reflect only the horizontal resistivity. However, if the axis of the tool is inclined with respect to the normal of the formation plane (i.e., for non-zero relative dip angle), the rock anisotropy affects the resistivity derived from phase shift measurements ("phase shift resistivity" or $R_\Phi$) differently than it affects the resistivity derived from amplitude attenuation measurements ("amplitude attenuation resistivity" or $R_A$). For small relative dip angles (e.g, $\theta$ less than about 45°), the difference between phase shift and amplitude attenuation resistivities is relatively small. However, this difference becomes significant for relative dip angles greater than about 50°, and the difference is large for horizontal boreholes (i.e., $\theta=90°$).

Before the present invention, practitioners in the art have used a number of techniques to determine the anisotropy of earth formations, most of which involve the use of coil antennas to measure resistivity. However, each of the existing techniques suffers from one or more disadvantages. For example, U.S. Pat. No. 4,980,643, issued Dec. 25, 1990 to Gianzero and Su, teaches the use of additional receiver coils oriented differently from (not co-axial with) conventional receiver coils to detect skew signals induced by skewness in the magnetic field pattern in the presence of asymmetrical formations. The axis of such additional receiver coils according to the '643 patent is preferably orthogonal to that of the conventional receiver coils, which are co-axial with the tool axis. However, such orthogonal coil (antenna) configurations are not generally considered practical for a measuring while drilling (MWD) or logging while drilling (LWD) tool because, if the coil is located in the interior of the tool, the presence of the coil necessitates a non-conventional mud flow path and decreases the mechanical strength of the tool. If, on the other hand, the additional coil is located on the exterior of the tool, the coil is susceptible to damage by formation cuttings in the return mud flow.

Similarly, U.S. Pat. No. 5,329,448, issued Jul. 12, 1994 to Rosthal, discloses a method and apparatus for determining the horizontal and vertical resistivities of an earth formation using an iterative error minimization technique. However, the '448 patent, which discloses a conventional antenna configuration in which the transmitter and receiver coils are aligned co-axially with the tool, does not provide a way to determine the relative dip angle. Instead, the relative dip angle must be obtained from another measurement source or from prior knowledge of the formation. Likewise, U.S. Pat. No. 5,656,930, issued Aug. 12, 1997 to Hagiwara, discloses a method for determining the anisotropic properties of subterranean formations comprising thinly laminated sand/shale sequences using an induction logging tool. However, like the '448 patent, the method of the '930 patent requires the derivation of the relative dip angle from another measurement.

In a technical paper entitled "A New Method to Determine Horizontal Resistivity in Anisotropic Formations Without Prior Knowledge of Relative Dip," 37th SPWLA 37th Annual Logging Symposium, New Orleans, Jun. 16–19, 1996, Hagiwara discloses a method to determine the horizontal resistivity for deviated boreholes or dipping formations using two conventional induction-type resistivity measurements. However, Hagiwara's method does not provide the relative dip angle. To obtain the relative dip angle, the formation anisotropy must be known. Moreover, Hagiwara showed that, for conventional induction logging tools (in which the transmitter and receiver antennas are oriented co-axially with the tool), it is impossible to obtain all three parameters (horizontal resistivity, vertical resistivity, and relative dip angle) simultaneously. The reason such a simultaneous solution is not possible using conventional induction logging tools is that, in the response of such tools, the vertical resistivity and the relative dip angle are coupled (i.e., they are not independent).

In European Patent Application No. 97118854.5 by Wu, published May 6, 1998, Wu discloses a method and apparatus for determining horizontal conductivity, vertical conductivity, and relative dip angle during a drilling operation. If the relative dip angle is unknown, Wu's technique involves the formulation of a relationship between the dielectric constants of the formation to the anisotropic conductivities of the formation. However, in the proof by Hagiwara mentioned above, the dielectric constants are assumed quantities, and their contribution to the phase shift resistivity is minimal. Therefore, even if the dielectric constants are known, the vertical resistivity and the relative dip angle are still coupled and do not allow for a simultaneous solution.

It would, therefore, be a significant advancement in the art to provide an improved method and apparatus for simultaneously determining the horizontal resistivity, vertical resistivity, and relative dip angle in a MWD or LWD mode of operation.

Furthermore, to maximize the production of hydrocarbons from a petroleum well, it would be beneficial to steer the drilling apparatus with respect to geological bed boundaries in order to maintain the borehole within a desired hydrocarbon-bearing earth formation or "payzone." As discussed by Luling in U.S. Pat. No. 5,241,273, when conventional resistivity tools traverse geological bed boundaries between formations having different resistivities, the responses of such tools exhibit horns at the bed boundaries. Before the advent of the method disclosed by Luling, practitioners in the art considered such horns to be unfortunate anomalies and sought ways to eliminate the horns. By contrast, Luling recognized the value of such horns and disclosed a method of utilizing the horns to assist with directional drilling. However, Luling teaches the use of conventional transmitter and receiver antennas oriented in planes orthogonal to the tool axis, and such conventional resistivity tools produce the same type of horn response regardless of whether the tool travels from a region of lower resistivity to higher resistivity or from a region of higher resistivity to lower resistivity. Consequently, as a conventional resistivity tool approaches a bed boundary between a first bed having one resistivity and a second bed having a different resistivity, Luling's method indicates only the presence of the boundary; Luling's method does not provide an early indication of whether the resistivity of the second bed is higher or lower than that of the first bed. Only after the tool crosses the boundary and travels a sufficient distance into the second bed will Luling's method provide an indication as to whether the resistivity increased or decreased so that the driller can make a decision regarding which bed is more desirable. As a result, Luling's method may lead to unnecessary penetrations into undesirable beds.

In U.S. Pat. No. 5,230,386, Wu and Wisler disclose another method of maintaining a drillstring in a certain formation during a directional drilling operation using an electromagnetic propagation resistivity sensor. However, the method of Wu and Wisler requires a reference resistivity log with which to compare the readings of the resistivity sensor in the directional drilling operation. The reference resistivity log is obtained by drilling and logging an offset vertical well near the location of the desired directional well or by creating an assumed log based on known geological information concerning the area of interest. The method of Wu and Wisler involves significant drawbacks in terms of the time, expense, and uncertainty associated with such a reference resistivity log.

A technical paper entitled "A New Generation of Electrode Resistivity Measurements for Formation Evaluation While Drilling," by Bonner et al., SPWLA 35th Annual Logging Symposium, Jun. 19–22, 1994, discloses a focused electrode resistivity tool that is azimuthally sensitive and could be used to steer a drillstring during a directional drilling operation. However, such electrode resistivity tools operate by forcing electric current into an earth formation by direct conduction, which requires conductive mud. Consequently, such electrode resistivity tools will not function properly in oil-based mud or in the presence of resistive invasion.

U.S. Pat. No. 5,508,616 to Sato et al. discloses an induction logging method and apparatus for determining the electric conductivity distribution of an earth formation in the circumferential direction about the borehole. The apparatus of the '616 patent employs transmitter and receiver coils that are disposed along the tool axis in a manner such that the coils face each other in an inclined fashion at symmetric angles. Although the '616 apparatus provides directional sensitivity which may be helpful in steering a drilling tool, the '616 patent does not teach how to utilize a transmitter and a receiver oriented at arbitrary inclination angles with respect to each other in order to take advantage of the special characteristics of the horns in the resulting response.

In light of the foregoing limitations, it would also be a significant advancement in the art to provide an improved method and apparatus for steering a downhole tool during a directional drilling operation in order to maintain the borehole within a desired earth formation by providing an advance indication of the resistivity of a given formation before entry into the formation. Such an improved method and apparatus would not require an offset vertical well or an assumed reference resistivity log and would be functional in oil-based or water-based mud and conditions of resistive or conductive invasion.

SUMMARY OF THE INVENTION

Accordingly, this invention is directed to an improved downhole method and apparatus for simultaneously determining the horizontal resistivity, vertical resistivity, and relative dip angle for anisotropic earth formations. The present invention accomplishes this objective by using an antenna configuration in which a transmitter antenna and a receiver antenna are oriented in non-parallel planes such that the vertical resistivity and the relative dip angle are decoupled. Preferably, either the transmitter or the receiver is mounted in a conventional orientation in a first plane that is normal to the tool axis, and the other antenna is mounted in a second plane that is not parallel to the first plane. Although this invention is primarily intended for MWD or LWD applications, this invention is also applicable to wireline and possibly other applications.

This invention is also directed to an improved downhole method and apparatus for steering a downhole tool during a directional drilling operation in order to maintain the borehole within a desired geological formation by providing an advance indication of the resistivity of a given bed before entry into that bed. Such steering capability is achieved by providing transmitter and receiver antennas that are mounted in non-parallel planes and computing the difference or the ratio of the phase-based or amplitude-based responses of the receiver antennas. With such an antenna arrangement, the ratio or difference of the responses indicates whether the resistivity of an approaching bed is higher or lower than the resistivity of the present bed. With such information, the driller may steer the drilling apparatus in order to maintain the borehole in a desired geological bed.

BRIEF DESCRIPTION OF THE DRAWINGS

This invention may best be understood by reference to the following drawings.

DETAILED DESCRIPTION OF A PREFERRED EMBODIMENT

Figure 1:
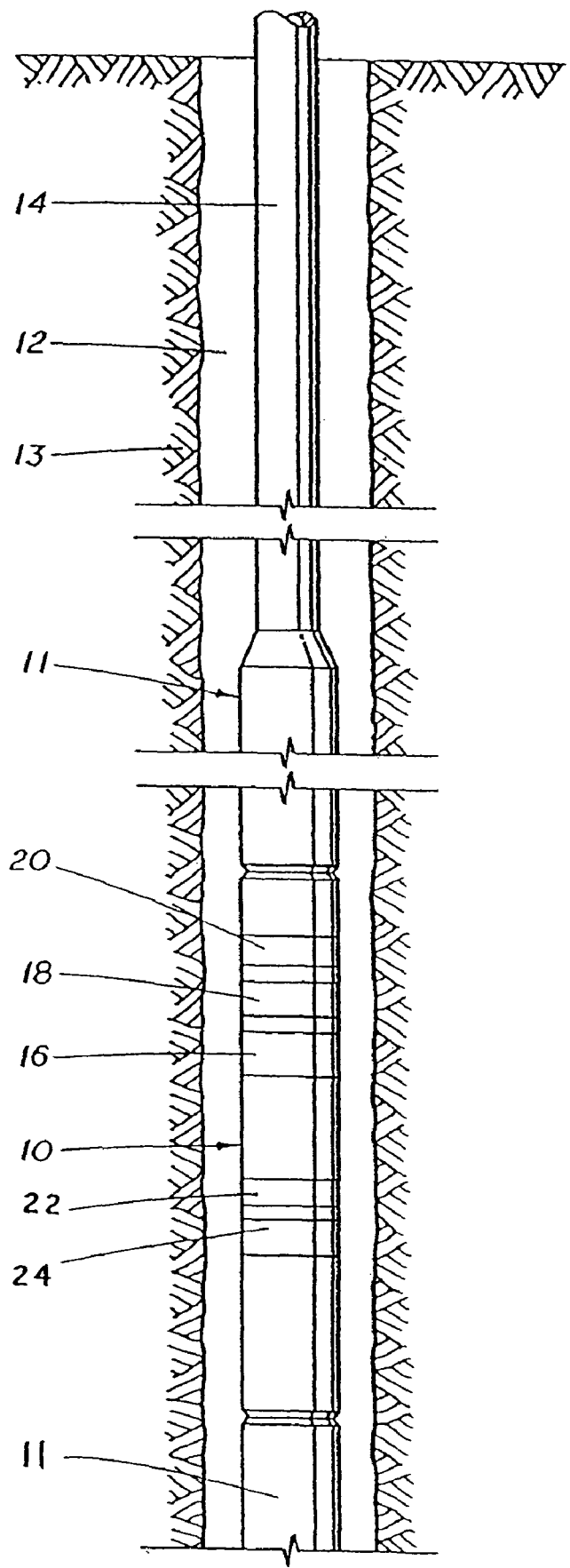
FIG. 1 is a schematic elevational view of an electromagnetic wave resistivity tool in accordance with the present invention.
Figure 2:
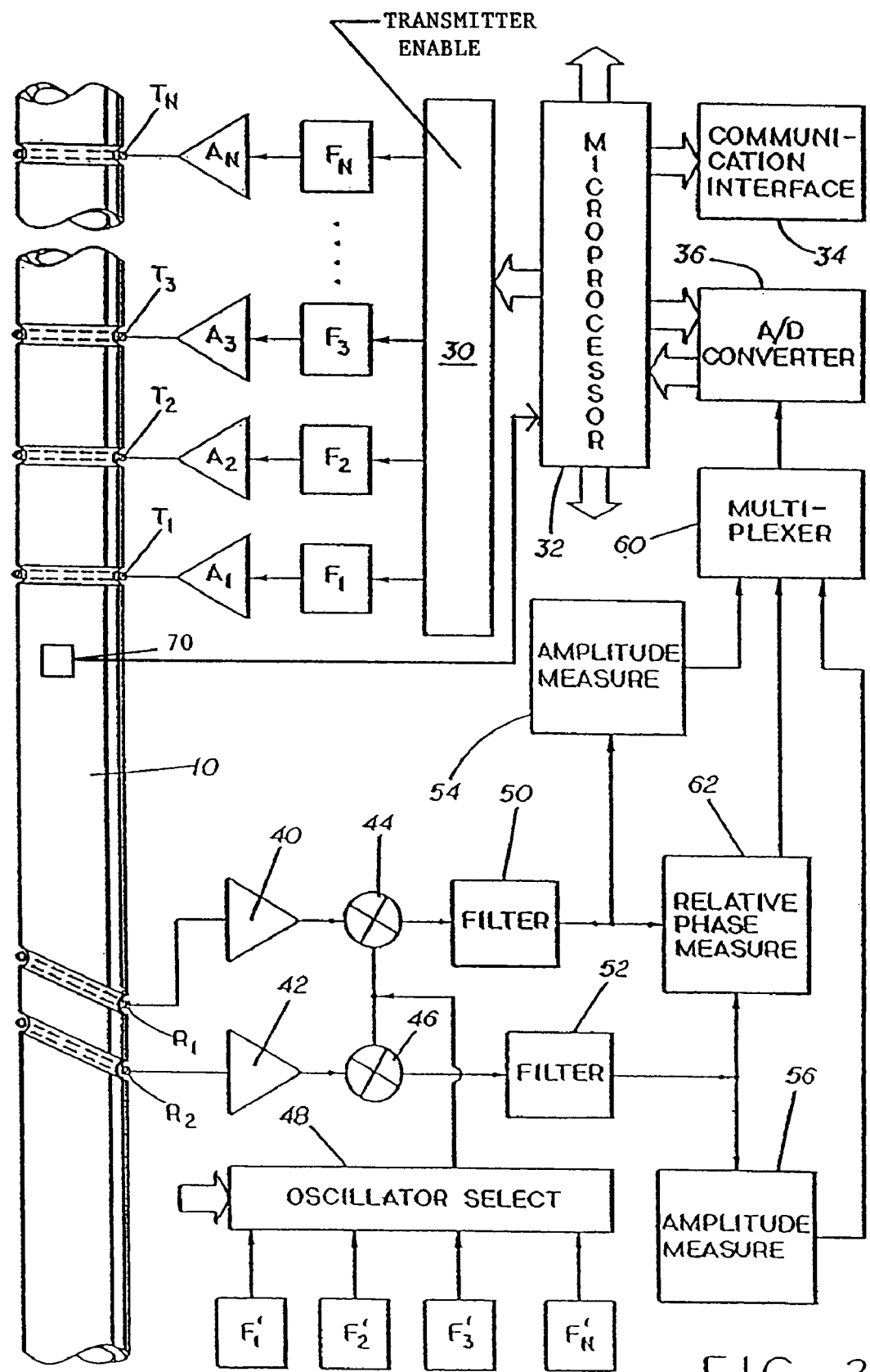
FIG. 2 is a schematic elevational view of a portion of the tool of FIG. 1 showing a block diagram of the circuitry used in accordance with the present invention.

FIG. 1 illustrates a logging tool 10 in accordance with the present invention suspended in a borehole 12 within an earth formation 13 on a string of drill pipe 14. Drill string 14 includes one or more drill collars 11. Electromagnetic transmitters (antennas) 16, 18, and 20 (sometimes referred to herein as transmitters $T_1$, $T_2$, and $T_3$, respectively) are spaced along the length of logging tool 10 from electromagnetic receivers (antennas) 22 and 24 (sometimes referred to herein as $R_1$ and $R_2$, respectively). Preferably, transmitters 16, 18, 20 and receivers 22, 24 are mounted in recesses in tool 10 (as indicated in FIG. 2) and are covered with a non-conductive material (not shown), as is well known in the art. If a transmitter is designed to operate at more than one frequency, for example, $f_1=2$ MHz and $f_2=1$ MHz, each receiver may comprise a pair of coils, with one coil tuned to $f_1$ and one coil tuned to $f_2$. Additionally, if desired, each pair of such receiver coils may be located side by side around the periphery of tool 10 or may be concentrically stacked. Transmitters 16, 18, 20 and receivers 22, 24 may be fabricated in accordance with the teachings of U.S. Pat. No. 4,940,943, which is assigned to the assignee of the present invention and is incorporated herein by reference. It should be appreciated that the body of tool 10 is preferably made of steel in order to prevent tool 10 from becoming a weak link in the drill string 14. Typically, and in a manner well known in the art, one or more drill collars 11 are threadably connected to the lower end of logging tool 10, and a drill bit (not illustrated) is threadably connected to the lowest drill collar It should be appreciated that logging tool 10 also has the requisite electronic circuitry (illustrated in FIG. 2) for processing the signals received by receivers 22, 24 in accordance with the present invention, thereby converting the received signals into a log or another indication of formation resistivity. It should also be appreciated that the processed signals can be recorded within the electronics section of tool 10 or may be fed by a conventional telemetry system (not illustrated) to the surface for concurrent processing and readout at the surface. A typical telemetry system generates mud pulses that can be detected at the earth's surface and are indicative of the processed signals.

Referring to FIG. 2, well logging tool 10 is illustrated as having a plurality of transmitters $T_1$, $T_2$, $T_3$ . . . $T_n$. Although a preferred embodiment comprises only three such transmitters ($T_1$, $T_2$, and $T_3$), $T_n$ is illustrated for purposes of showing that additional transmitters may be used, if desired. It should be appreciated that $T_1$, $T_2$, $T_3$ . . . $T_n$ are successively further spaced from the receiver pair $R_1$ and $R_2$. The distance between the coils used for $R_1$ and $R_2$ is preferably six inches along the longitudinal axis of tool 10, but other receiver spacings may also be used. The distance between the receiver pair and the successively spaced transmitters will vary in some applications, as discussed hereinafter in greater detail. A preferred configuration contains a distance between $T_1$ and $R_1/R_2$ of 12 inches/18 inches; a distance between $T_2$ and $R_1/R_2$ of 24 inches/30 inches; and a distance between $T_3$ and $R_1/R_2$ of 36 inches/42 inches. In the foregoing sentence, it should be understood that the term "12 inches/18 inches," for example, indicates that the distance between $T_1$ and $R_1$ is 12 inches and that the distance between $T_1$ and $R_2$ is 18 inches, based upon $R_1$ and $R_2$ being six inches apart. Such spacing configurations are sometimes referred to herein using an abbreviated expression of, for example, "12/18."

Still referring to FIG. 2, a plurality of amplifiers $A_1$, $A_2$, $A_3$ . . . $A_n$ are coupled to the transmitter coils $T_1$, $T_2$, $T_3$ . . . $T_n$, respectively. The plurality of amplifiers, in turn, are driven, respectively, by oscillators $F_1$, $F_2$, $F_3$ . . . $F_n$. The operating frequencies of the oscillators are preferably between about 0.5 MHz up to about 4 MHz. Because of power attenuation at greater depths of investigation, such as is the case with the longer spaced transmitters, the frequencies preferably conform to the relationship $F_1 \geq F_2 \geq F_3 \geq \ldots F_n$. The oscillators $F_1$, $F_2$, $F_3$ . . . $F_n$ are controlled by a transmitter enable circuitry 30, which interfaces with a microprocessor 32, which in turn interfaces with a communication interface circuit 34 and an analog-to-digital (A/D) converter 36. Communication interface circuit 34 is conventional and provides an interface between computers (not shown), an internal memory (not shown), a mud pulser (not shown), microprocessor 32, and operators or computers at the earth's surface (not shown) after the tool 10 is removed to the earth's surface.

The differential receivers $R_1$ and $R_2$ are respectively connected to amplifiers 40 and 42, which are connected, respectively, to mixer circuits 44 and 46. Oscillators $F_1'$, $F_2'$, $F_3'$ . . . $F_n'$ are coupled to an oscillator select circuit 48, the output of which is connected to the respective inputs of mixer circuits 44 and 46. Oscillator select circuit 48 receives its inputs from microprocessor 32.

The respective outputs of mixer circuits 44 and 46 drive low pass filters 50 and 52, respectively, the outputs of which drive amplitude measurement circuits 54 and 56, respectively. The outputs of amplitude measurement circuits 54 and 56 are connected to a multiplexer circuit 60. The outputs of low pass filter circuits 50 and 52 are also connected to the inputs of a relative phase measurement circuit 62, the output of which is fed into multiplexer 60.

Figure 13:
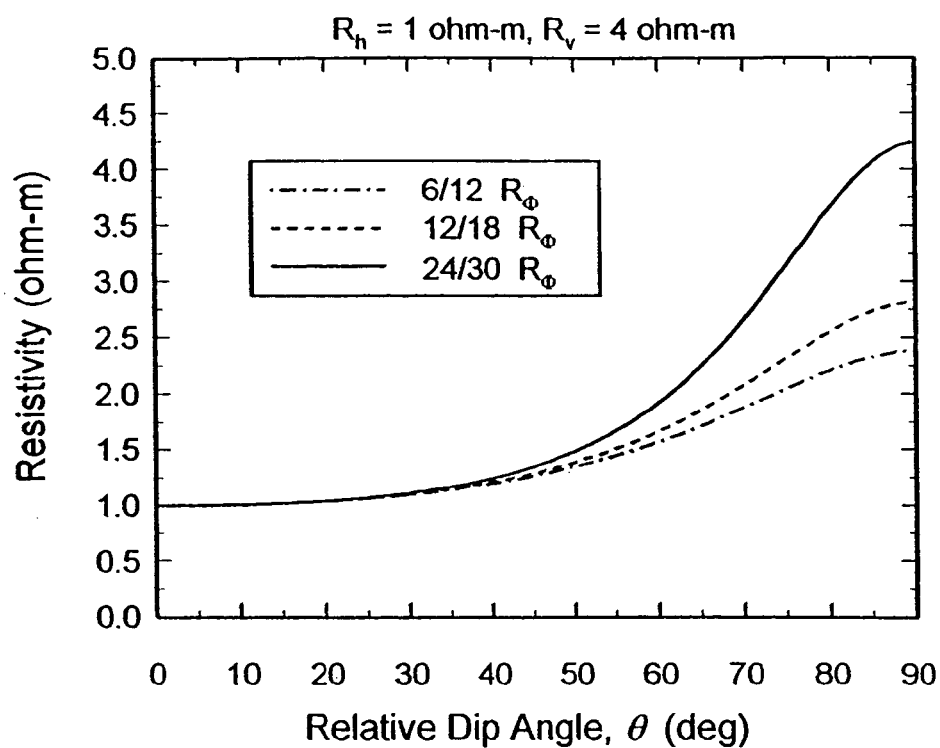
FIG. 13 is a graph of apparent resistivity versus relative dip angle for a typical earth formation using three transmitter-receiver pairs at a single frequency.
Figure 12:
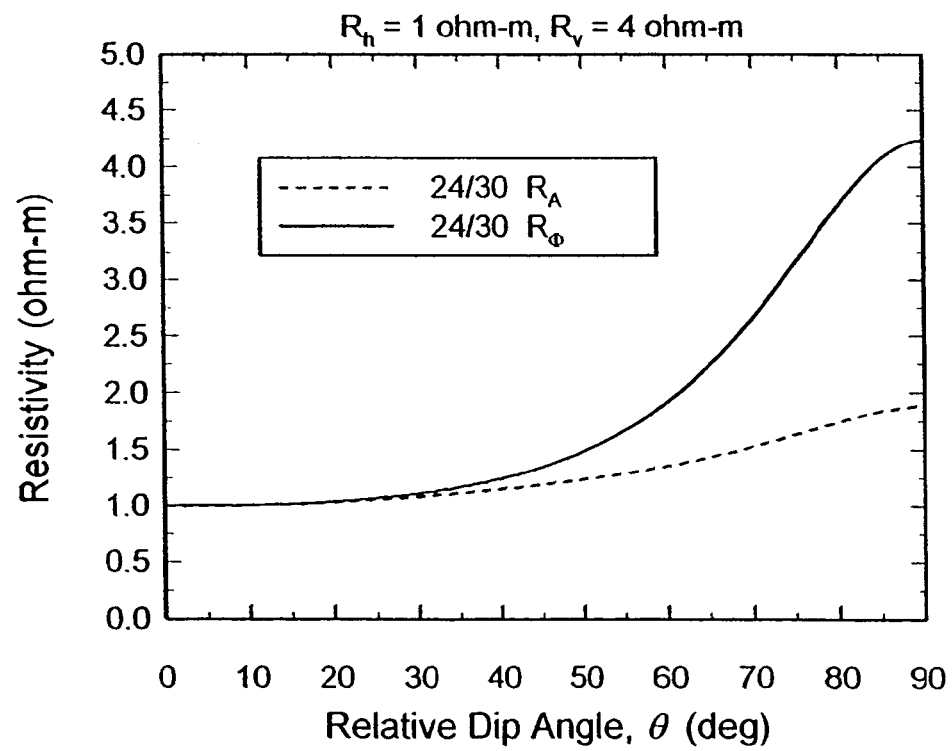
FIG. 12 is a graph of apparent resistivity versus relative dip angle for a typical earth formation using a single transmitter-receiver pair.
Figure 14:
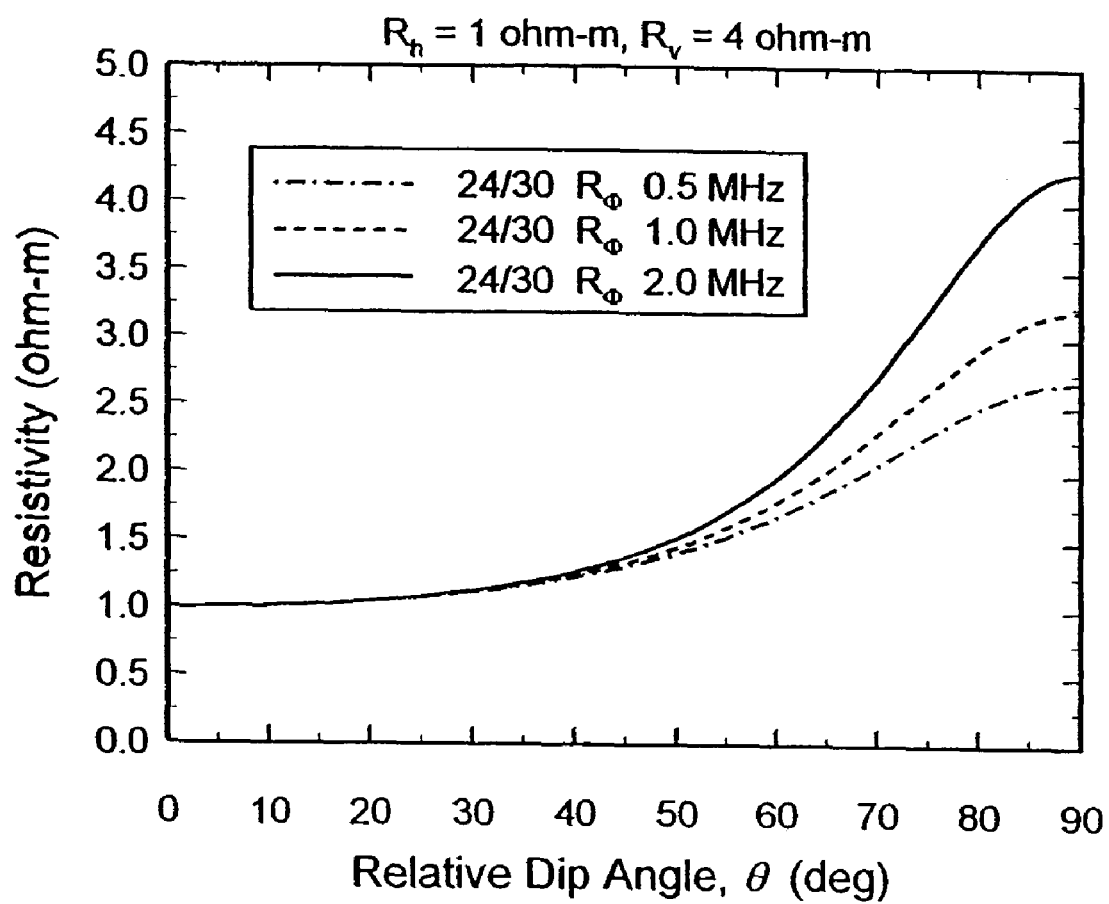
FIG. 14 is a graph of apparent resistivity versus relative dip angle for a typical earth formation using a single transmitter-receiver pair at three different frequencies.

In the operation of the device and circuitry illustrated in FIG. 2, it should be appreciated that it is desirable to process intermediate frequency signals rather than the nominal signals received by receiver pair $R_1$ and $R_2$. Accordingly, the oscillators $F_1'$, $F_2'$, $F_3'$ . . . $F_n'$ are selected to be very near the corresponding frequencies $F_1$, $F_2$, $F_3$ . . . $F_n$. For example, $F_n$ can be set at a frequency of 1.998 MHz and thus provide an intermediate frequency coming out of mixer circuit 44 or 46 of 0.002 MHz (2 KHz). In a similar fashion, $F_2'$ and $F_3'$ can be set at 1.998 MHz and 0.998 MHz, respectively. Thus, the only signals that pass to low pass filters 50 and 52 will be the intermediate frequencies which are obtained by mixing the frequencies of $F_1$, $F_2$, $F_3$ . . . $F_n$ with the frequencies $F_1'$, $F_2'$, $F_3'$ . . . $F_n'$, respectively. It should be appreciated that amplitude measurement circuit 54 provides a measure of the amplitude of the signal received by receiver $R_1$, whereas amplitude measurement circuit 56 measures the amplitude of the incoming signals received by receiver $R_2$. Similarly, relative phase measurement circuit 62 provides an indication of the phase difference between the signals received at receiver $R_1$ and the signals received at receiver $R_2$. As is well known in the art, the amplitude measurements (ratios, A) and the relative phase measurements ($\Phi$) are both indicative of formation resistivity. Such measurements may be used to generate plots such as those shown in FIGS. 12–14 for a typical earth formation having a horizontal resistivity of 1 ohm-m and a vertical resistivity of 4 ohm-m. FIG. 12 depicts amplitude attenuation resistivity and phase shift resistivity as a function of relative dip angle using a single transmitter-receiver pair at a single frequency. FIG. 13 depicts phase shift resistivity as a function of relative dip angle using three transmitter-receiver pairs at a single frequency. FIG. 14 depicts phase shift resistivity as a function of relative dip angle using a single transmitter-receiver pair at three different frequencies.

Figure 3:
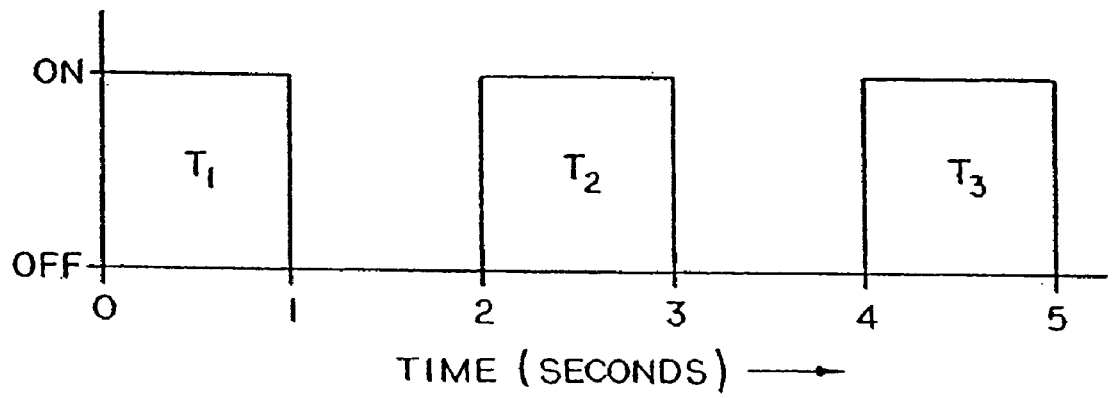
FIG. 3 is a schematic pulse diagram illustrating a time sequence of transmitter pulses of the tool of FIG. 1.
Figure 4:
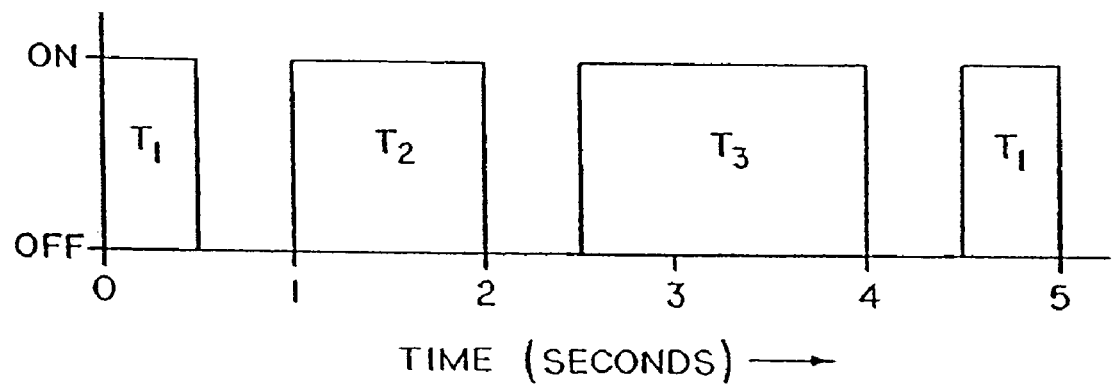
FIG. 4 is a schematic pulse diagram illustrating an alternative time sequence of transmitter pulses of the tool of FIG. 1.

It should also be appreciated that the frequencies $F_1$, $F_2$, $F_3 \ldots F_n$ could all be the same frequency except for the practical considerations of power loss in the formation due to the increased distance the signals have to travel through the formation. However, the conventional multiplexer circuitry 60 used with this system enables time separation between the sequential pulsing of the transmitters $T_1$, $T_2$, $T_3 \ldots T_n$. For example, as illustrated in FIG. 3, transmitter $T_1$ can be pulsed for one second, followed by no pulse for one second, followed by the pulsation of transmitter $T_2$ for one second, followed by no pulse for one second, followed by a pulsing of transmitter $T_3$ for one second, and so on. Quite obviously, the duration of the pulsing for each transmitter can be varied, as well as the duration of no pulsing in between, for example, as illustrated in FIG. 4. It should be appreciated that the expression "time separation" between pulses includes the preferred embodiment of having one pulse commence immediately with the termination of the immediately preceding pulse. As desired, the duration of the pulses controlling $T_1$ may vary from the duration of the pulses for $T_2$, which may vary from the duration of the pulses for transmitter $T_3$, and so on, in order to provide a signature of the received pulses at receivers $R_1$ and $R_2$ to better identify the transmitters and thus the depth of investigation for the particular pulses being received. Thus, measurements are made to different depths into the formation by activating each transmitter at a different time such that only one transmitter is active at any one time and by recording or telemetering the received phase difference and/or amplitudes (amplitude ratio) corresponding to each transmitted signal. Alternatively, the transmitters $T_1$, $T_2$, $T_3 \ldots T_n$ could all be operated at different frequencies and could be pulsed simultaneously, with the separation of signals being a function of frequency difference rather than time separation in accordance with a preferred embodiment of this invention. However, those skilled in the art will recognize that simultaneous transmission of all of the transmitter signals will usually require additional filters and processing circuitry to enable the instrument to properly discriminate between the different frequencies.

Figure 5:
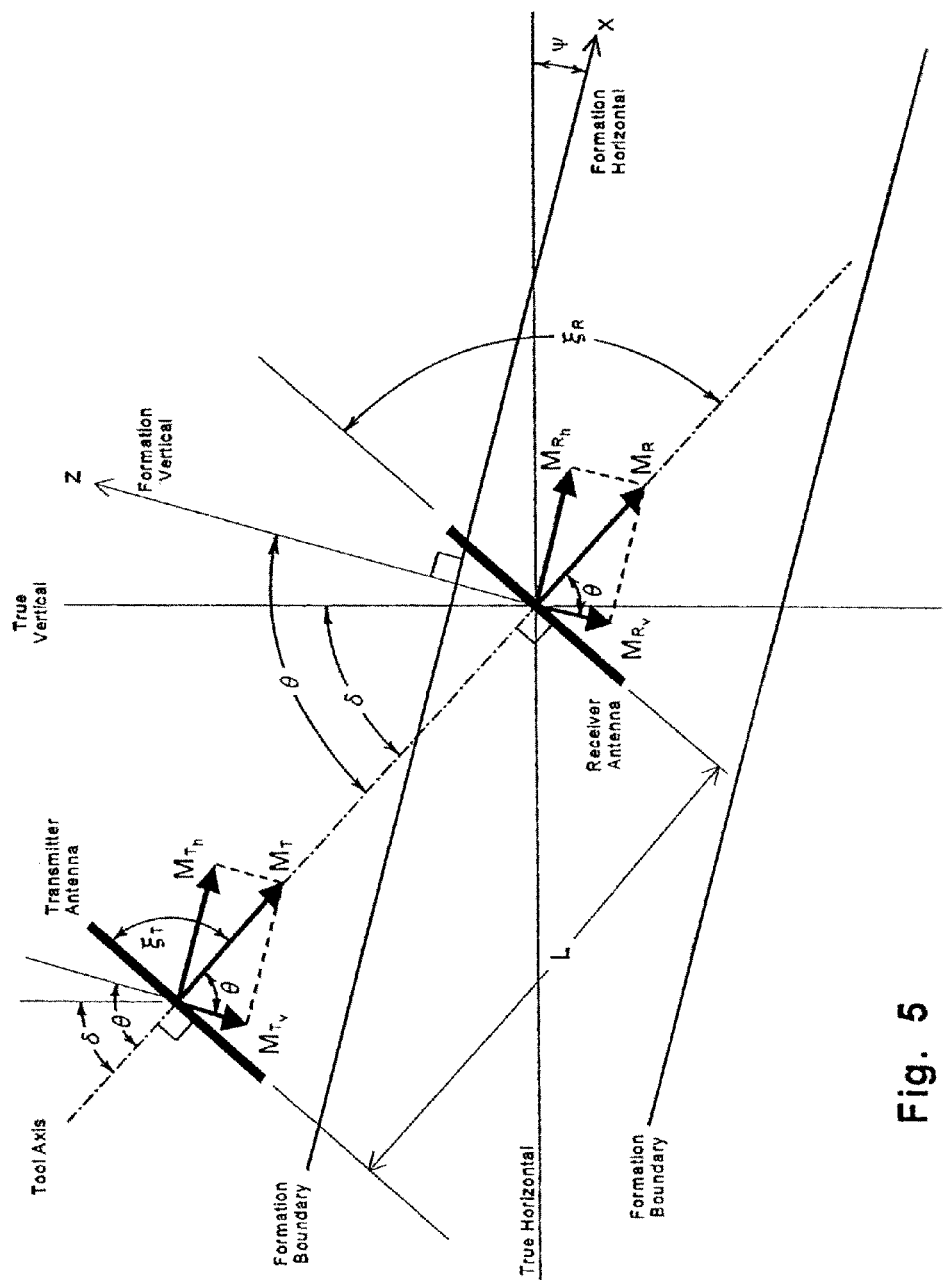
FIG. 5 is a schematic diagram illustrating the antenna geometry of a conventional electromagnetic wave resistivity tool having a transmitter antenna and a receiver antenna, both of which are mounted to the tool in a plane that is orthogonal to the axis of the tool.
Figure 6:
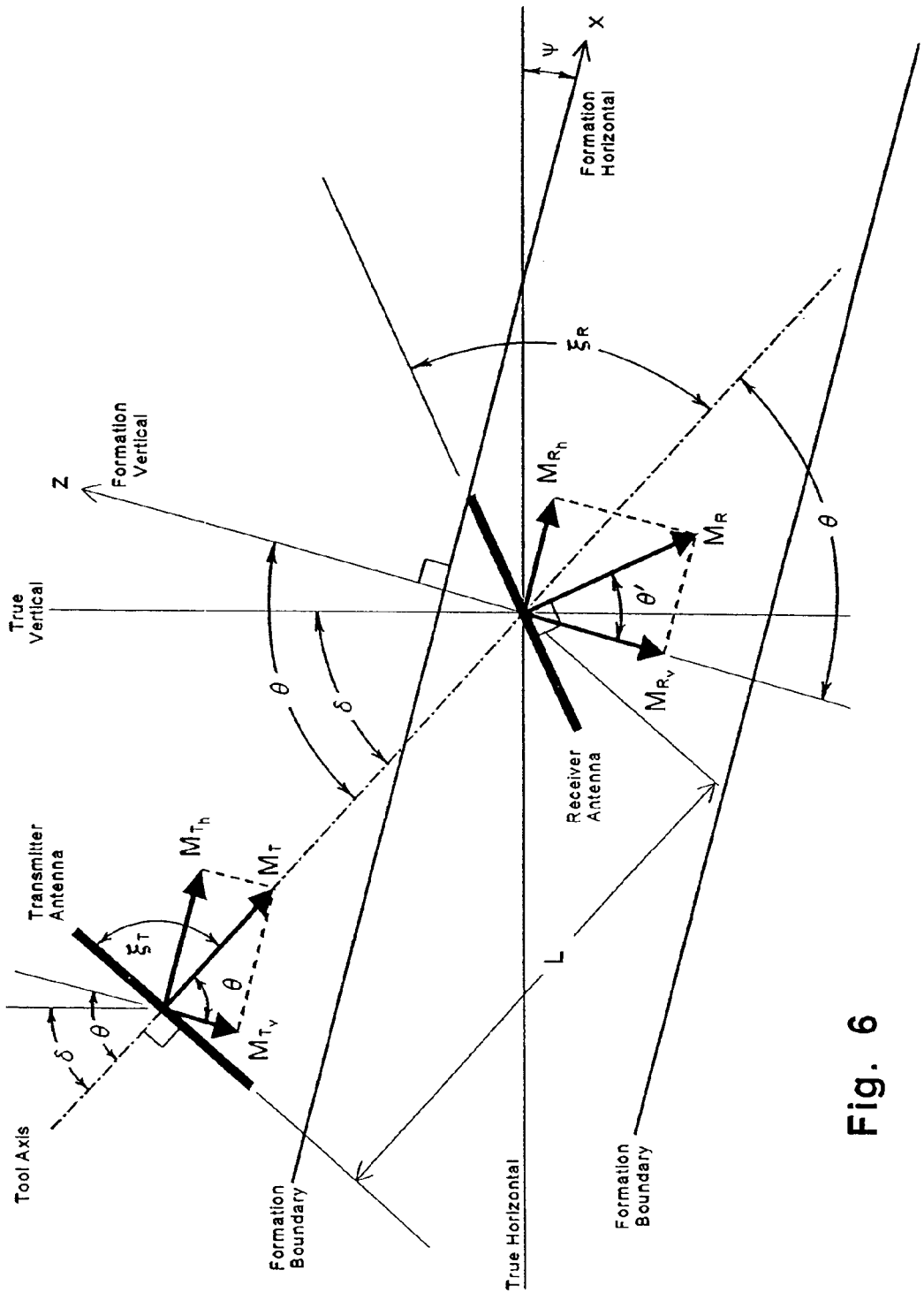
FIG. 6 is a schematic diagram illustrating the antenna geometry of an electromagnetic wave resistivity tool in accordance with the present invention having a transmitter antenna mounted to the tool in a plane that is orthogonal to the axis of the tool and a receiver antenna mounted to the tool in a plane that is not orthogonal to the axis of the tool.
Figure 9:
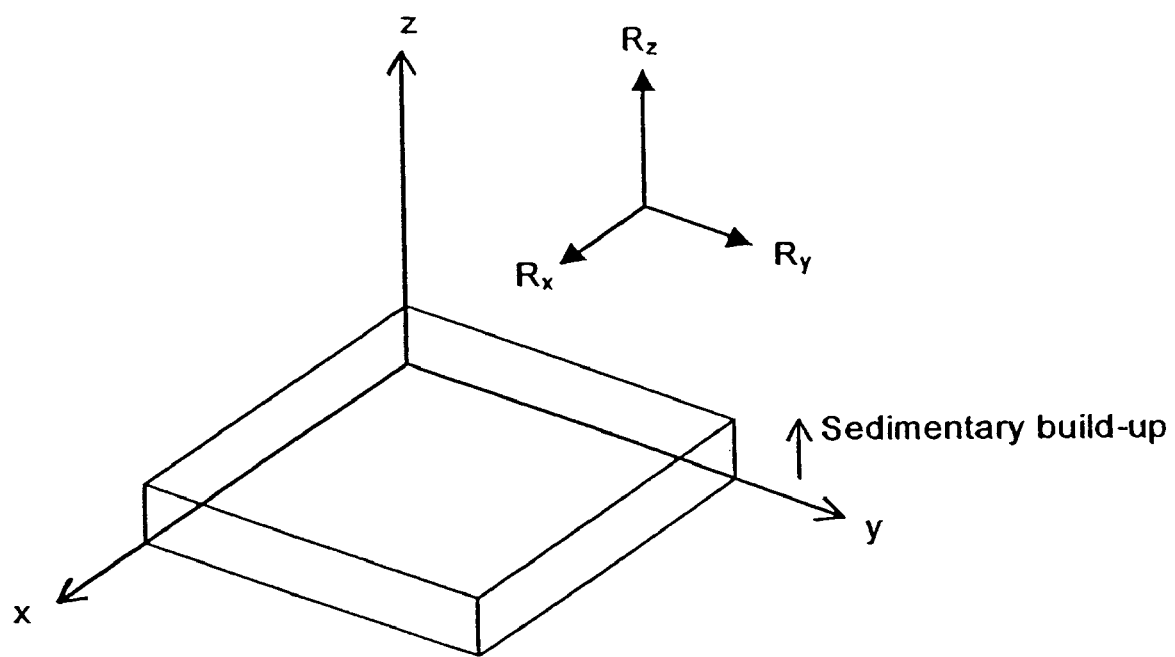
FIG. 9 is a schematic perspective view of a Cartesian coordinate system in a sedimentary earth formation.

As discussed above, due to the nature of sedimentary formations, practitioners in the art use the term "horizontal" to denote the plane of the formation (i.e., the x-y plane of FIG. 9), and practitioners use the term "vertical" to denote the direction perpendicular to the plane of the formation (i.e., the z direction of FIG. 9, which is the direction of sedimentary build-up). For convenience in distinguishing between these terms of art and the ordinary directions associated with the earth's gravity, FIGS. 5 and 6 utilize the following terms: "true vertical" indicates the direction of the earth's gravity; "true horizontal" indicates the direction perpendicular to the earth's gravity; "formation vertical" indicates the direction perpendicular to the plane of the formation; and "formation horizontal" indicates the plane of the formation. In this description, the terms "horizontal" and "vertical" are intended to have the meanings associated with "formation horizontal" and "formation vertical," respectively. In FIGS. 5 and 6, $\delta$ is the hole deviation angle (the angle between the borehole/tool axis and the true vertical), and $\psi$ is the bed dip angle (the angle between the formation bed plane and the true horizontal).

Referring to FIG. 5, a transmitter coil (antenna) with a magnetic moment $M_T$ can be considered as the superposition of a horizontal magnetic dipole (HMD) and a vertical magnetic dipole (VMD), with corresponding horizontal and vertical component magnetic moments $M_{T_h}$ and $M_{T_v}$, respectively, which are given by the equations $$M_{T_h} = M_T \sin\theta = I_t A_t \sin\theta \qquad [1]$$

$$M_{T_v} = M_T \cos\theta = I_t A_t \cos\theta \qquad [2]$$

where
  $I_t$=the current in the transmitter coil,
  $A_t$=the cross-sectional area of the transmitter coil, and
  $\theta$=the relative dip angle (the angle between the tool axis and the normal to the formation).

As shown by Luling, M. G., "Processing and Modeling 2-MHz Resistivity Tools in Dipping, Laminated, Anisotropic Formations," SPWLA 35th Annual Logging Symposium, Jun. 19–22, 1994, the HMD produces magnetic fields $H_{hx}$ and $H_{hz}$, and the VMD produces magnetic fields $H_{vx}$ and $H_{vz}$ as follows:

$$H_{hx} = \frac{M_T \sin\theta}{4\pi} \left( \frac{e^{ik_h L}}{L^3} \left[ 3\sin^2\theta - 1 + k_h^2 L^2 \cos^2\theta + \frac{ik_h L}{\sin^2\theta} + ik_h L - 3ik_h L \sin^2\theta \right] - \frac{ik_h}{\sin^2\theta} e^{ik_h L\beta} \right) e^{ik_h L} \qquad [3]$$

$$H_{hz} = \frac{M_T \cos\theta}{4\pi} \left( \frac{e^{ik_h L}}{L^3} [3\cos\theta\sin\theta - k_h^2 L^2 \cos\theta\sin\theta - 3ik_h L\cos\theta\sin\theta] \right) \qquad [4]$$

$$H_{vx} = \frac{M_T \sin\theta}{4\pi} \left( \frac{e^{ik_h L}}{L^3} [3\cos\theta\sin\theta - k_h^2 L^2 \cos\theta\sin\theta - 3ik_h L\cos\theta\sin\theta] \right) \qquad [5]$$

$$H_{vz} = \frac{M_T \cos\theta}{4\pi} \left( \frac{e^{ik_h L}}{L^3} [3\cos^2\theta - 1 + k_h^2 L^2 \sin^2\theta - 3ik_h L\cos^2\theta + ik_h L] \right) \qquad [6]$$

where $$k_h = \sqrt{\omega^2 \mu \left(\varepsilon_h - \frac{i\sigma_h}{\omega}\right)}$$

$$k_v = \sqrt{\omega^2 \mu \left(\varepsilon_v - \frac{i\sigma_v}{\omega}\right)}$$

-continued $$\beta = \sqrt{\cos^2\theta + \left(\frac{k_v}{k_h}\right)^2 \sin^2\theta}$$

$k_h$=the complex wave number in the horizontal direction
$k_v$=the complex wave number in the vertical direction
$\omega$=the angular frequency (in radians/second) of the transmitter coil=$2\pi f$
f=the frequency of the transmitter coil (in Hertz)
$\mu$=the magnetic permeability of the formation (assume $\mu=\mu_{air}=1$)
$\sigma_h$=the horizontal conductivity of the formation
$\sigma_v$=the vertical conductivity of the formation
$\in_h$=the horizontal dielectric constant (assumed)
$\in_v$=the vertical dielectric constant (assumed)
L=the distance between the transmitter coil and the receiver coil
i=$\sqrt{-1}$ If a receiver is parallel to the transmitter, for a conventional configuration as shown in FIG. 5 in which $\xi_T=\xi_R=90°$, the $H_z$ field in the receiver loop is given by the equation $$H_z=(H_{hx}+H_{vx})\sin\theta+(H_{vz}+H_{hz})\cos\theta \quad [7]$$

and the induced voltage in the receiver loop is $$V=i\omega A_r \mu H_z \quad [8]$$

where $A_r$ is the cross-sectional area of the receiver coil. Substituting Eqs. [3], [4], [5], [6], and [7] into Eq. [8] yields $$V = \frac{i\omega A_r \mu I_t A_t}{4\pi L^3}([2-ik_hL]e^{ik_hL}-ik_hLe^{ik_hL\beta}) \quad [9]$$

Equation [9] shows that the induced voltage, V, depends on $k_h$ and $\beta$. In turn, $k_h$ depends on $\sigma_h$; and $\beta$ depends on $\sigma_h$, $\sigma_v$, and $\theta$. These relationships indicate that $\sigma_v$ and $\theta$ are dependent, and this dependency prevents convergence of a simultaneous solution for $\sigma_h$, $\sigma_v$, and $\theta$, as discussed above.

To break this dependency and enable a solution for $\sigma_h$, $\sigma_v$, and $\theta$, the present inventor discovered that one may tilt either the transmitter or the receiver with respect to the tool axis, as shown in FIG. 6 (transmitter not tilted, receiver tilted). For a transmitter/receiver configuration as shown in FIG. 6 in which $\xi_T=90°$ and $\xi_R<90°$, the $H_z$ field in the receiver loop is given by the equation $$H_z=(H_{hx}+H_{vx})\sin\theta'+(H_{vz}+H_{hz})\cos\theta' \quad [10]$$

Substitution of Eqs. [3], [4], [5], [6], and [10] into Eq. [8] yields $$V = \frac{i\omega A_r \mu I_t A_t}{4\pi L^3}\left(+[2\sin\theta\sin\theta'+2\cos\theta\cos\theta']\right.$$
$$e^{ik_hL}-[2ik_hL\sin\theta\sin\theta'-2ik_hL\cos\theta\cos\theta']e^{ik_hL}+$$
$$\left.ik_hL\frac{\sin\theta'}{\sin\theta}e^{ik_hL}-ik_hL\frac{\sin\theta'}{\sin\theta}e^{ik_hL\beta}\right) \quad [11]$$

where
$\theta'=\theta+\xi_R-90°$ $\xi_R$=the angle of tilt of the receiver antenna (i.e., the angle between the plane of the receiver antenna and the tool axis)
$\xi_T$=the angle of tilt of the transmitter antenna (i.e., the angle between the plane of the transmitter antenna and the tool axis).

Figure 7:
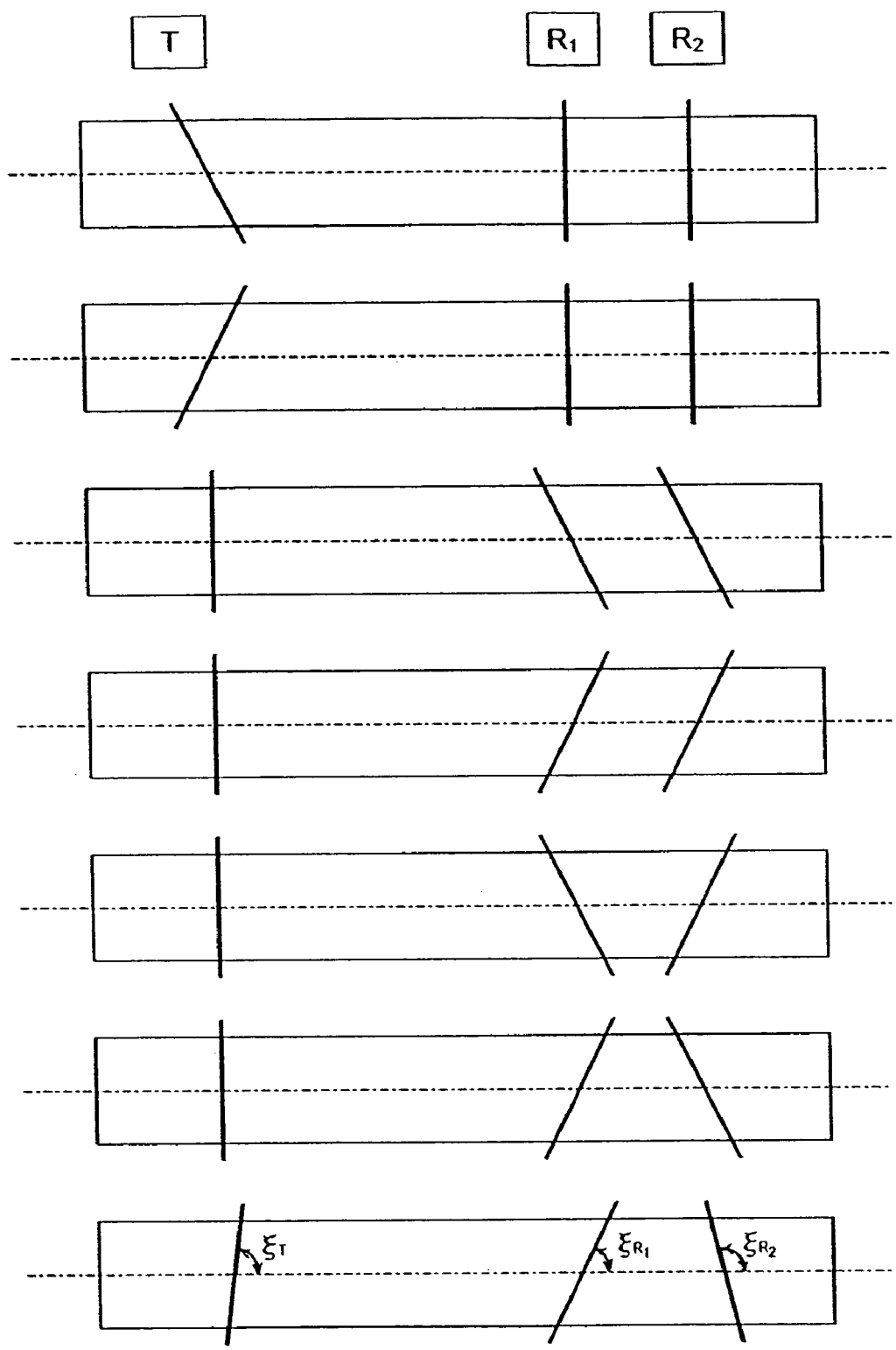
FIG. 7 is a schematic diagram illustrating several possible transmitter/receiver antenna configurations in accordance with the present invention.

Equation [11] shows that the induced voltage, V, depends on $k_h$, $\beta$, $\theta$, and $\theta'$. As long as $\theta$ is different from $\theta'$, then $\theta$ can be calculated from three measurements using a multiple spacing or multiple frequency electromagnetic wave resistivity tool. By tilting either the receiver or the transmitter of an electromagnetic wave resistivity sensor (i.e., by making $\theta$ different from $\theta'$), $\sigma_v$ and $\theta$ are decoupled, which enables a solution for $\sigma_h$, $\sigma_v$, and $\theta$ as described below. Although the above formulation is for an untilted transmitter with a tilted receiver, the theory of reciprocity provides that the same result also applies to a tilted transmitter with an untilted receiver. Indeed, both the transmitter and the receiver may be tilted, provided that the respective angles of tilt are not the same, i.e., $\xi_T \neq \xi_R$. For the general case in which both the transmitter and the receiver are tilted at arbitrary angles $\xi_T$ and $\xi_R$, respectively, Eqs. [1] through [11] apply with the substitution of $\theta''$ for $\theta$, where $\theta''=\theta+\xi_T-90°$. FIG. 7 illustrates several possible transmitter/receiver pair combinations in accordance with the present invention.

Figure 8:
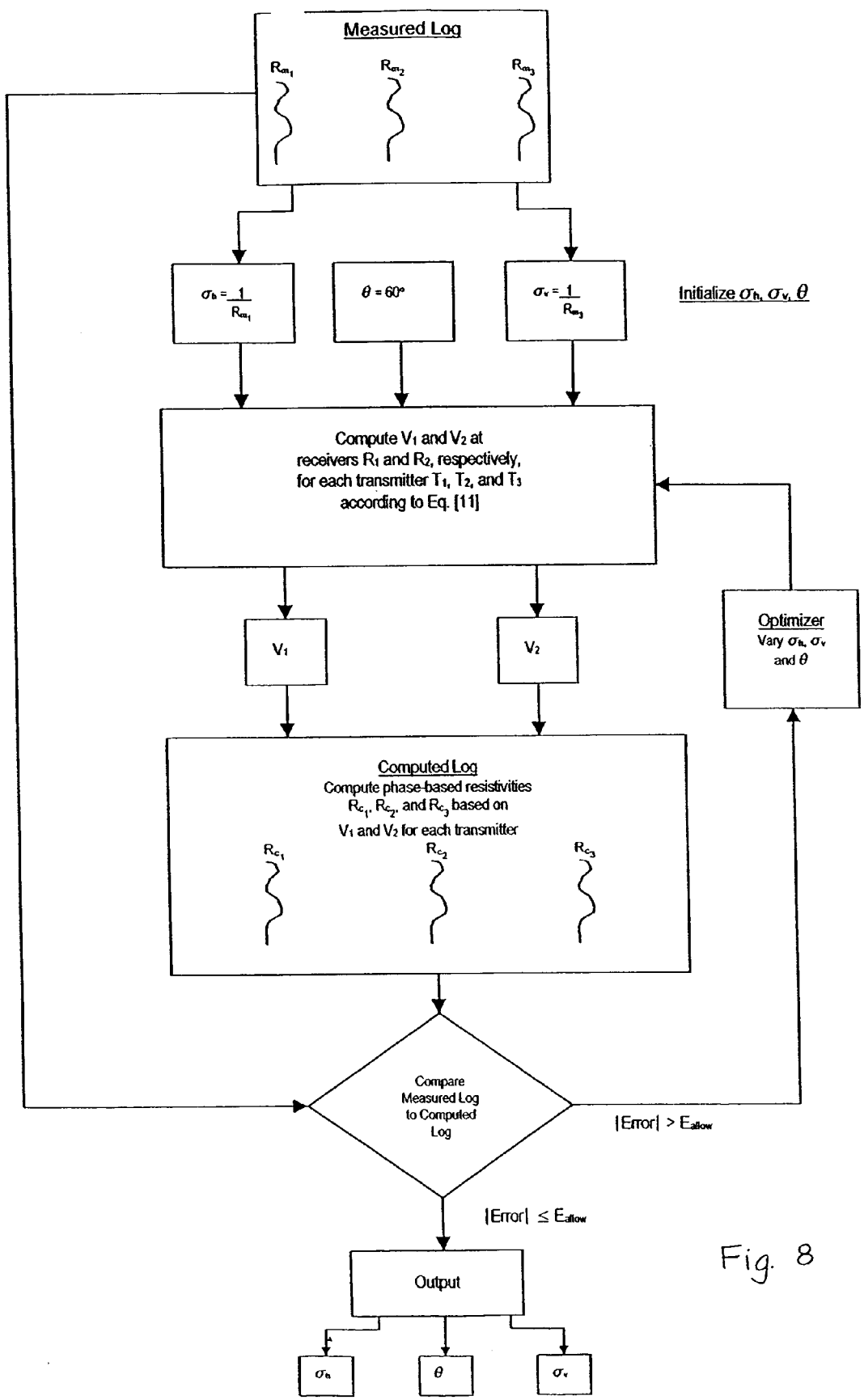
FIG. 8 is a schematic block diagram illustrating the process of solving for horizontal conductivity, vertical conductivity, and relative dip angle in accordance with the present invention.
Figure 11:
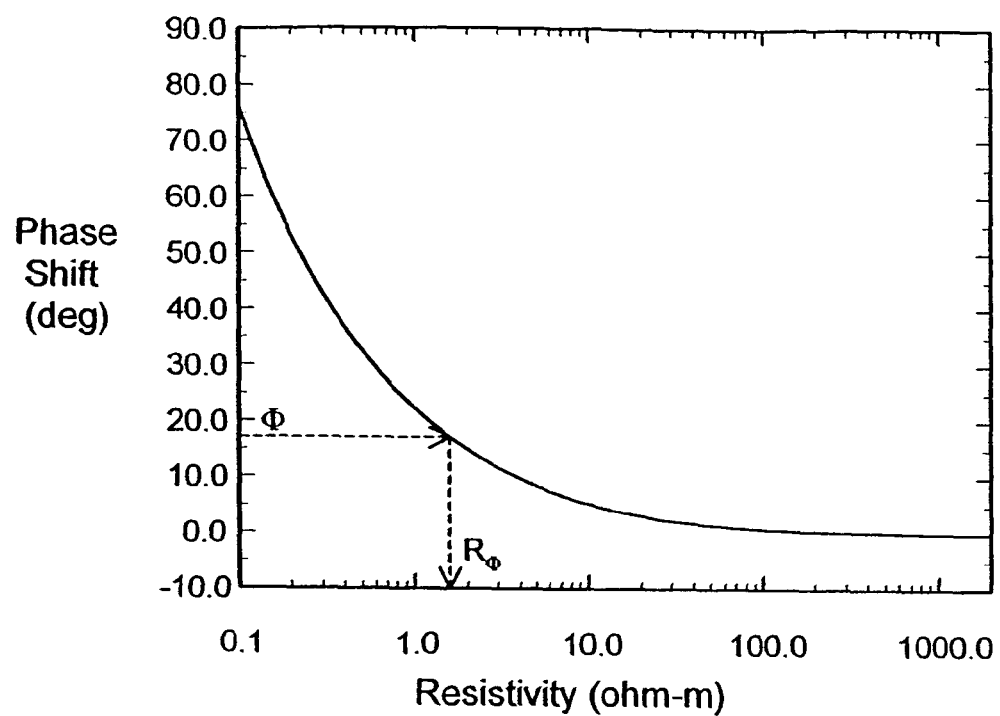
FIG. 11 is a graph of phase shift versus resistivity for a typical earth formation.
Figure 10:
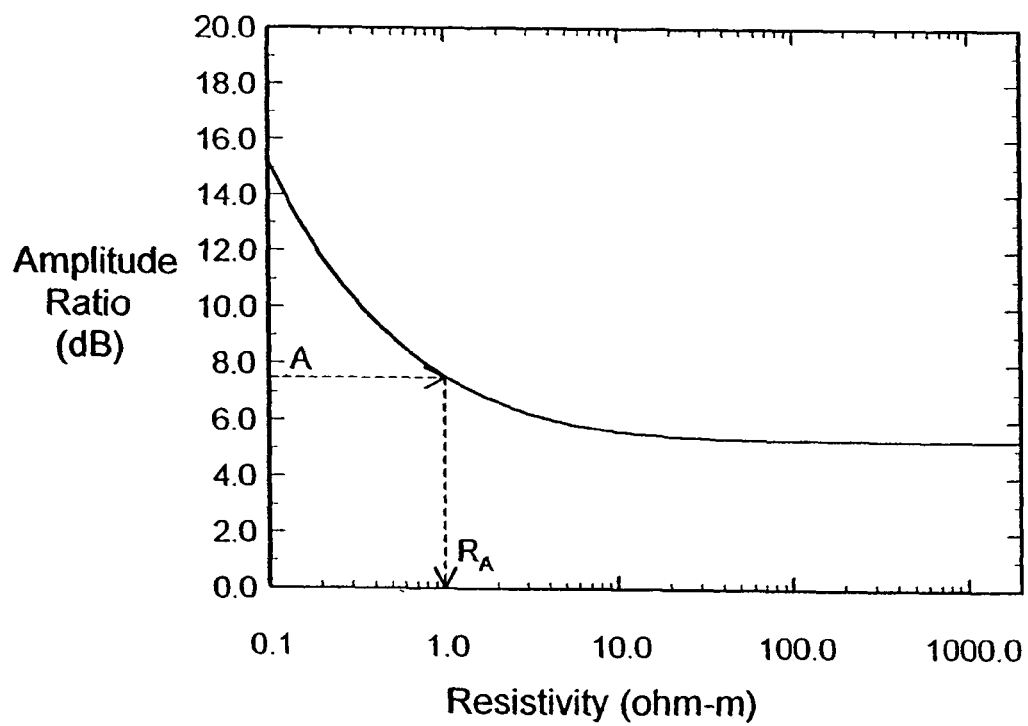
FIG. 10 is a graph of amplitude attenuation versus resistivity for a typical earth formation.

FIG. 8 illustrates the process of obtaining the horizontal resistivity, vertical resistivity, and relative dip angle of an earth formation in accordance with the present invention. Although the diagram of FIG. 8 shows horizontal and vertical conductivity rather than horizontal and vertical resistivity, persons reasonably skilled in the art understand that conductivity is the reciprocal of resistivity, and either conductivity or resistivity may be used to refer to the essential electrical property of an earth formation. The solution process begins with an initialization of the three parameters for which a solution is sought, namely, horizontal conductivity ($\sigma_h$), vertical conductivity ($\sigma_v$), and relative dip angle ($\theta$). As shown in FIG. 8, $\sigma_h$ and $\sigma_v$ may conveniently be initialized to the reciprocals of the measured resistivity values (measured log) as obtained from two of the three transmitter/receiver combinations according to methods well known in the art. Specifically, for each transmitter/receiver combination, the transmitter is pulsed and the phase shift ($\Phi$) and amplitude attenuation (A) of the receiver pair are measured. Then, using data such as that represented in FIGS. 10 and 11, the amplitude attenuation resistivity and phase shift resistivity, respectively, are obtained. The phase shift resistivities provide preferred initial estimates for $\sigma_h$ and $\sigma_v$, but the amplitude attenuation resistivities could also be used. Similarly, a convenient initial estimate for $\theta$ is 60°, which is within the range in which anisotropy typically becomes evident. Persons skilled in the art will appreciate that these preferred values for the initial parameter estimates serve the purpose of convenience to enhance the convergence of a solution. However, these particular values are not essential to the success of this invention, and the initial parameter estimates may be arbitrary.

Still referring to FIG. 8, after the parameters are initialized, these parameters are used to calculate theoretical "induced" voltages, $V_1$ and $V_2$, in receivers $R_1$ and $R_2$, respectively, for each transmitter according to Eq. [11]. Next, the calculated voltages are used to obtain computed resistivities $R_{C_1}$, $R_{C_2}$, and $R_{C_3}$ (computed log) corresponding to each transmitter/receiver pair combination, respectively. Again, the computed resistivities are obtained according to methods well known in the art using data such as that shown in FIGS. 10 and 11, and the phase shift resistivities are preferred over the amplitude attenuation resistivities. The computed resistivities are then compared to the measured resistivities, and the difference between the computed resistivities and the measured resistivities is used to form a suitable error measurement. If the magnitude of the error is less than or equal to an allowable error value, $E_{allow}$, then the current values for $\sigma_h$, $\sigma_v$, and $\theta$ are taken to be the solution. Otherwise, the values for $\sigma_h$, $\sigma_v$, and $\theta$ are incremented in an iterative optimization routine until the error is within the allowable error value. Any suitable optimization routine may be used, such as a least squares method. A preferred optimization method is the Levenberg-Marquardt method discussed by Tianfei Zhu and Larry D. Brown, "Two-dimensional Velocity Inversion and Synthetic Seismogram Computation," Geophysics, vol. 52, no. 1, January 1987, p. 37–50, which is incorporated herein by reference.

Figure 15:
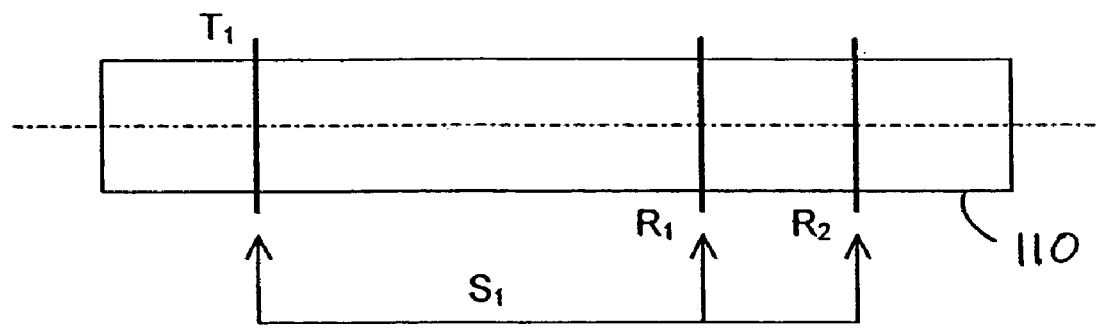
FIG. 15 is a schematic diagram showing a typical antenna arrangement for a conventional resistivity tool.
Figure 21:
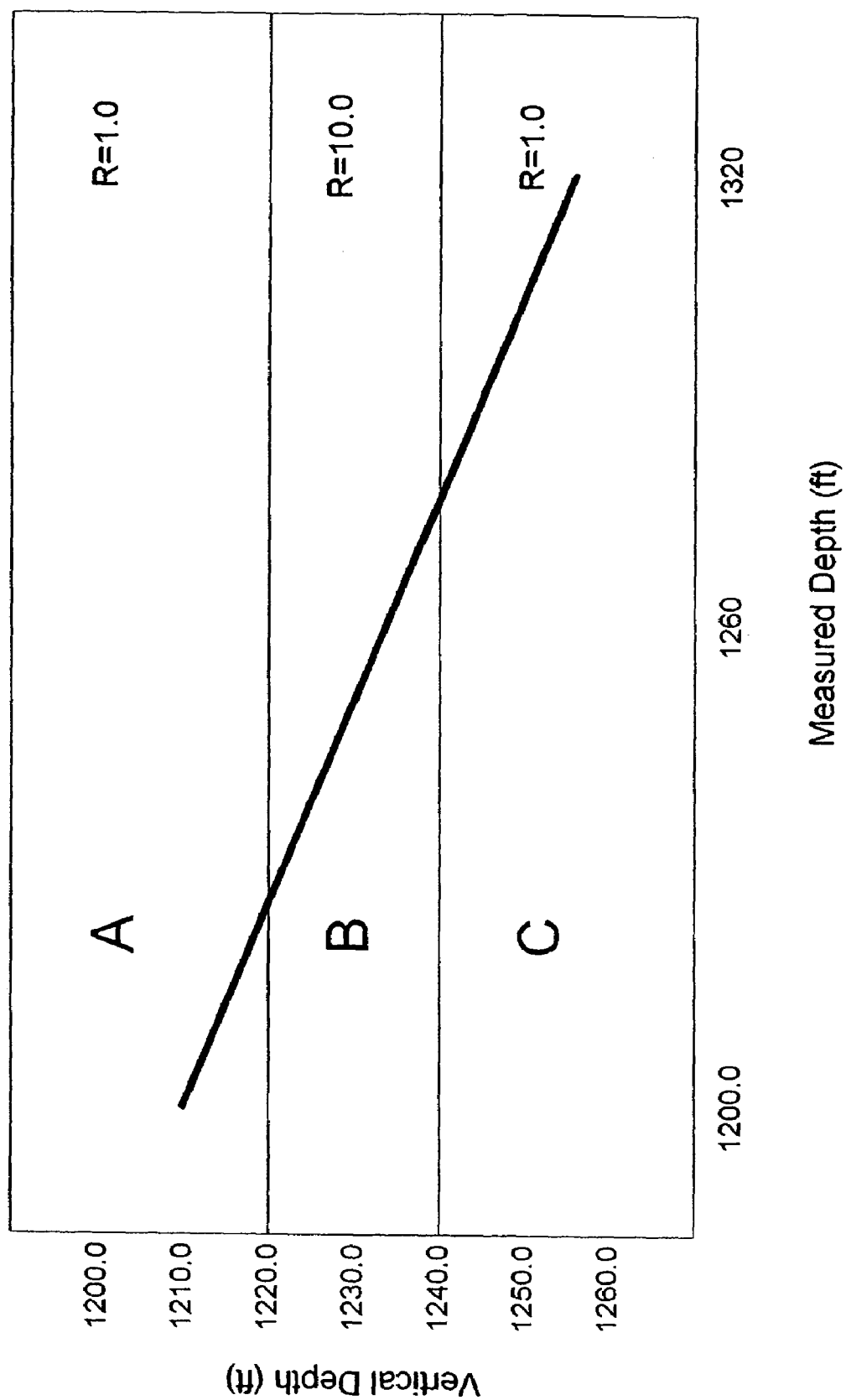
FIG. 21 is a graph of borehole measured depth versus true vertical depth for a borehole in a hypothetical earth formation.
Figure 22:
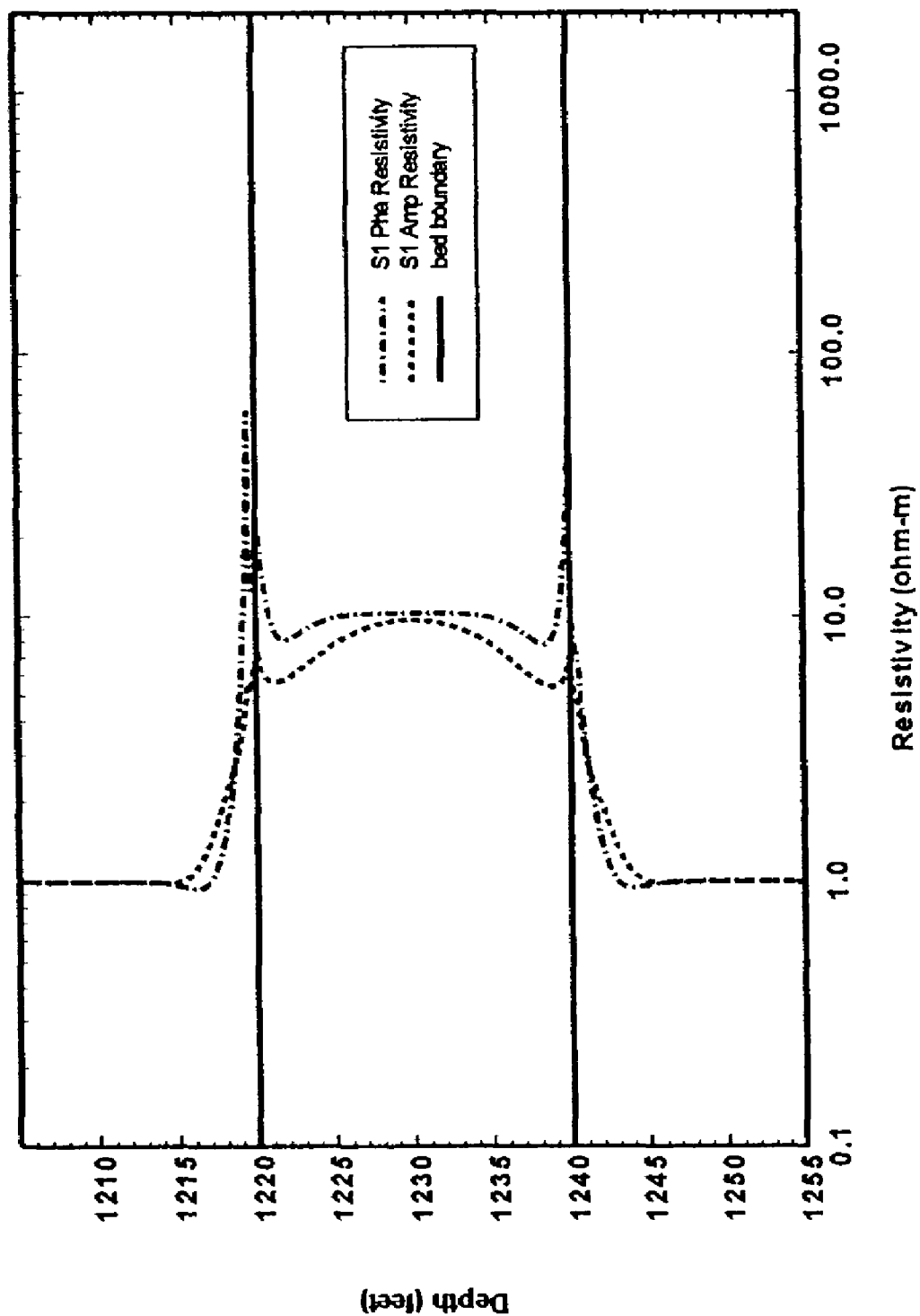
FIG. 22 is a graph showing the resistivity response of the conventional tool of FIG. 15 as it traverses through the borehole of FIG. 21.

Turning now to the geosteering aspect of this invention, FIG. 21 illustrates a borehole at a relative dip angle of $\theta=60°$ traversing through a hypothetical earth formation comprising geological zones (beds) A, B, and C having resistivities 1.0, 10.0, and 1.0, respectively. In the hypothetical formation of FIG. 21, zone B is a payzone. FIG. 15 illustrates a conventional resistivity tool 110 having a transmitter antenna $T_1$ and a pair of receiver antennas $R_1$ and $R_2$, all of which are arranged orthogonal to the tool axis. As conventional resistivity tool 110 traverses through the borehole of FIG. 21 without rotation, tool 110 produces a response $S_1$ as shown in FIG. 22, which includes horns at the intersection of the borehole with the boundaries of each of zones A, B, and C. Significantly, the horns of response $S_1$ increase in the same direction regardless of whether conventional tool 110 is crossing from a zone of lower resistivity to a zone of higher resistivity or vice versa.

Figure 16:
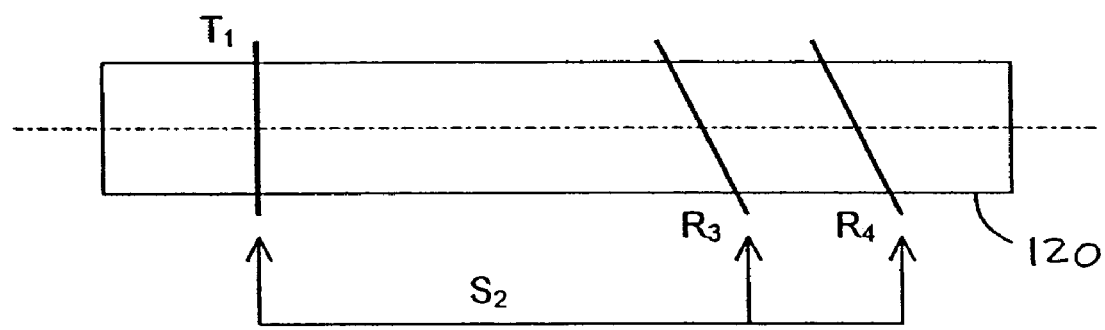
FIG. 16 is a schematic diagram showing one possible antenna arrangement for a tool in accordance with the present invention.
Figure 24:
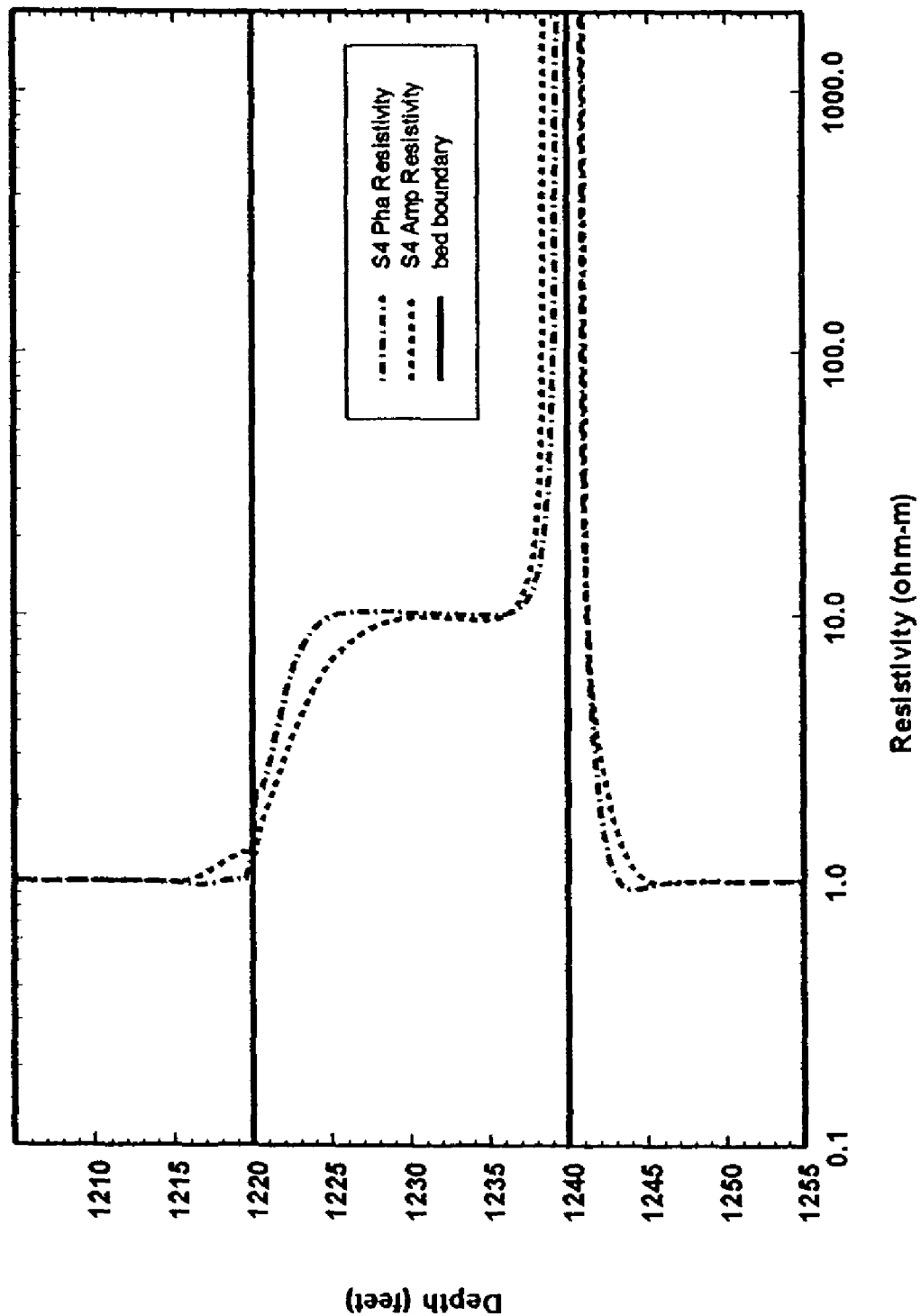
FIG. 24 is a graph showing the resistivity response associated with transmitter $T_2$ of the tool of FIG. 19 as it traverses through the borehole of FIG. 21.

By contrast, in accordance with the present invention, FIG. 16 depicts a resistivity tool 120 having a transmitter antenna $T_1$ that is orthogonal to the tool axis and a pair of receiver antennas $R_3$ and $R_4$ that are tilted +45° with respect to the tool axis. As tool 120 traverses through the borehole of FIG. 21 without rotation, tool 120 produces a response $S_2$ that is the same as response $S_4$ as shown in FIG. 24. Notably, response $S_2$ (or $S_4$) includes horns only at the locations at which tool 120 is approaching a zone of lower resistivity. Accordingly, tool 120 and the associated response $S_2$ (or $S_4$) are referred to herein as a "downward looking tool" and a "downward response."

Figure 17:
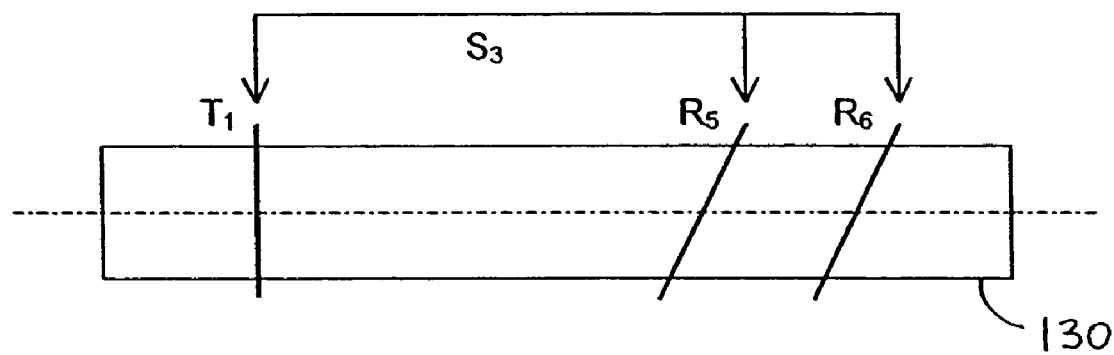
FIG. 17 is a schematic diagram showing another possible antenna arrangement for a tool in accordance with the present invention.
Figure 23:
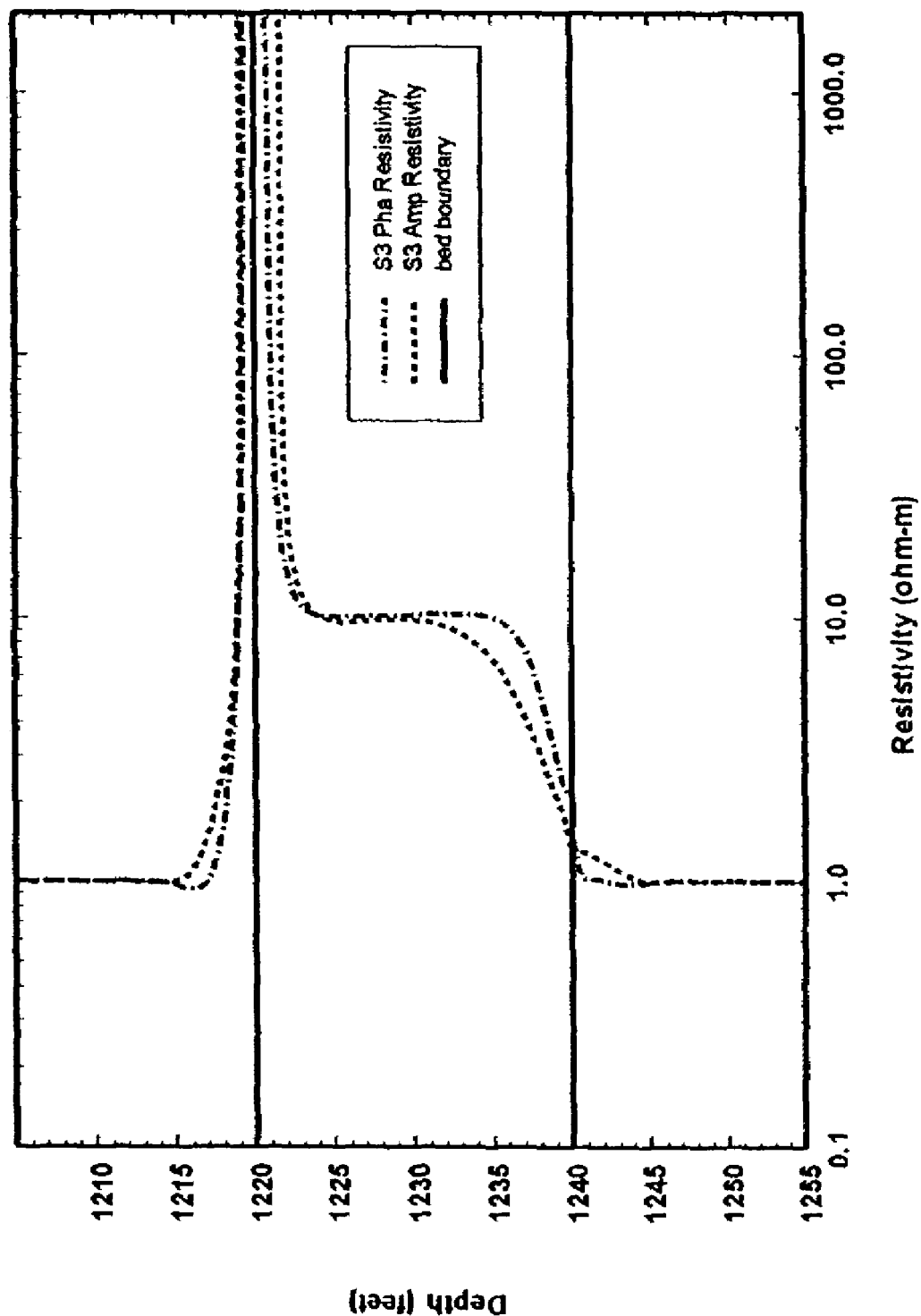
FIG. 23 is a graph showing the resistivity response associated with transmitter $T_1$ of the tool of FIG. 19 as it traverses through the borehole of FIG. 21.

Similarly, FIG. 17 depicts a resistivity tool 130 having a transmitter antenna $T_1$ that is orthogonal to the tool axis and a pair of receiver antennas $R_5$ and $R_6$ that are tilted −45° with respect to the tool axis. As tool 130 traverses through the borehole of FIG. 21 without rotation, tool 130 produces a response $S_3$ as shown in FIG. 23. Notably, response $S_3$ includes horns only at the locations at which tool 130 is approaching a zone of higher resistivity. Accordingly, tool 130 and the associated response $S_3$ are referred to herein as an "upward looking tool" and an "upward response." Persons reasonably skilled in the art will recognize that tool 130 is the same as tool 120 rotated 180° about the tool axis.

Figure 18:
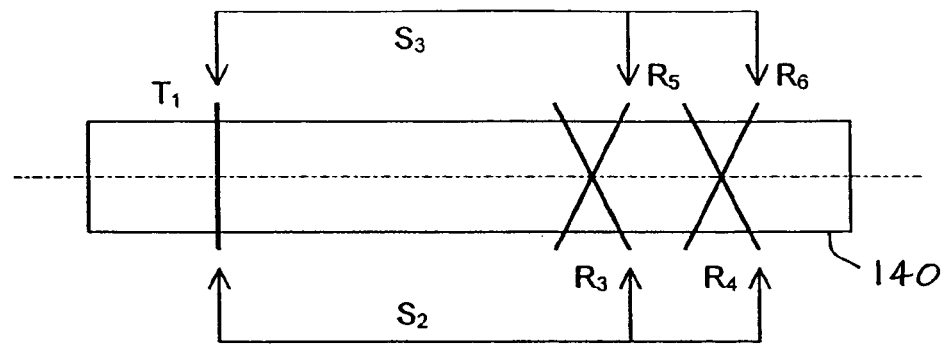
FIG. 18 is a schematic diagram showing yet another possible antenna arrangement for a tool in accordance with the present invention.
Figure 19:
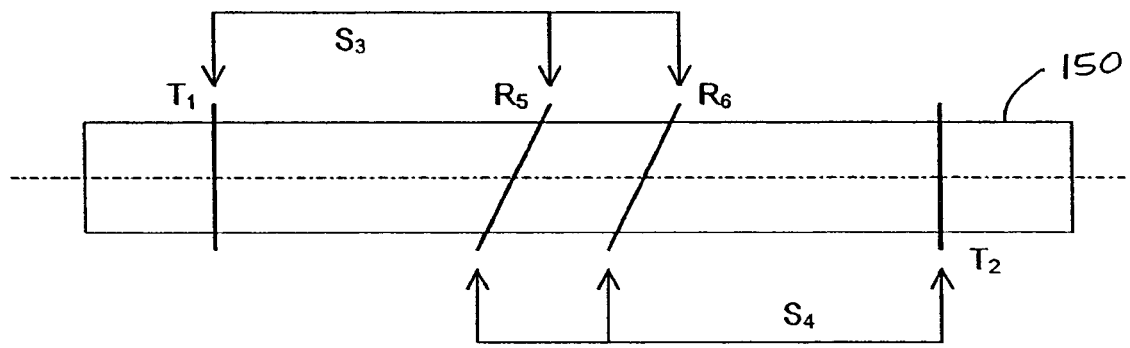
FIG. 19 is a schematic diagram showing yet another possible antenna arrangement for a tool in accordance with the present invention.
Figure 20:
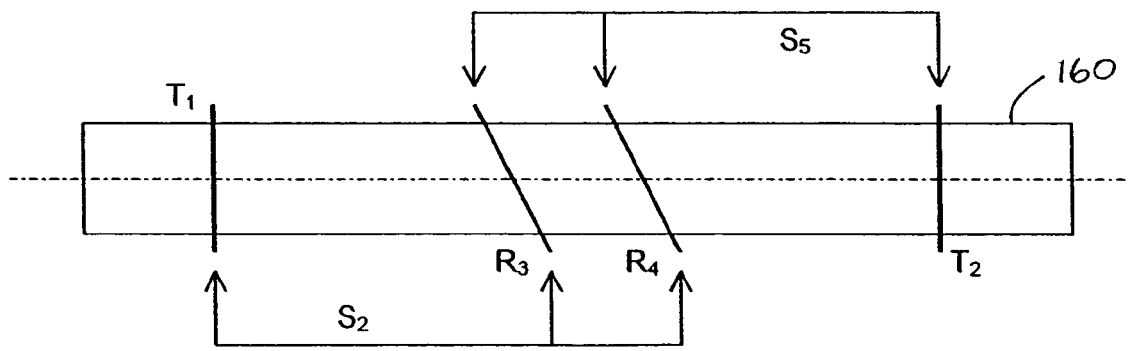
FIG. 20 is a schematic diagram showing yet another possible antenna arrangement for a tool in accordance with the present invention.

To obtain both responses $S_2$ (or $S_4$) and $S_3$ from a nonrotating tool, the tool may incorporate receiver antennas $R_3$, $R_4$, $R_5$, and $R_6$ as shown on tool 140 in FIG. 18. Alternatively, as shown in FIG. 19, the tool 150 may include an additional transmitter antenna $T_2$ on the opposite side of the receiver pair from transmitter antenna $T_1$. Responses $S_2$ and $S_4$ are the same because of the theory of reciprocity. Similarly, tool 160 of FIG. 20 will yield both responses $S_2$ and $S_5$ (which is the same as $S_3$) in a nonrotating mode of operation. Again, persons reasonably skilled in the art will recognize that tool 160 is the same as tool 150 rotated 180° about the tool axis. If the receiver antennas are mounted in recesses of the tool as discussed above, tool 150 (or 160) is generally preferred over tool 140 because tool 150 (or 160) is stronger and easier to manufacture.

Figure 25:
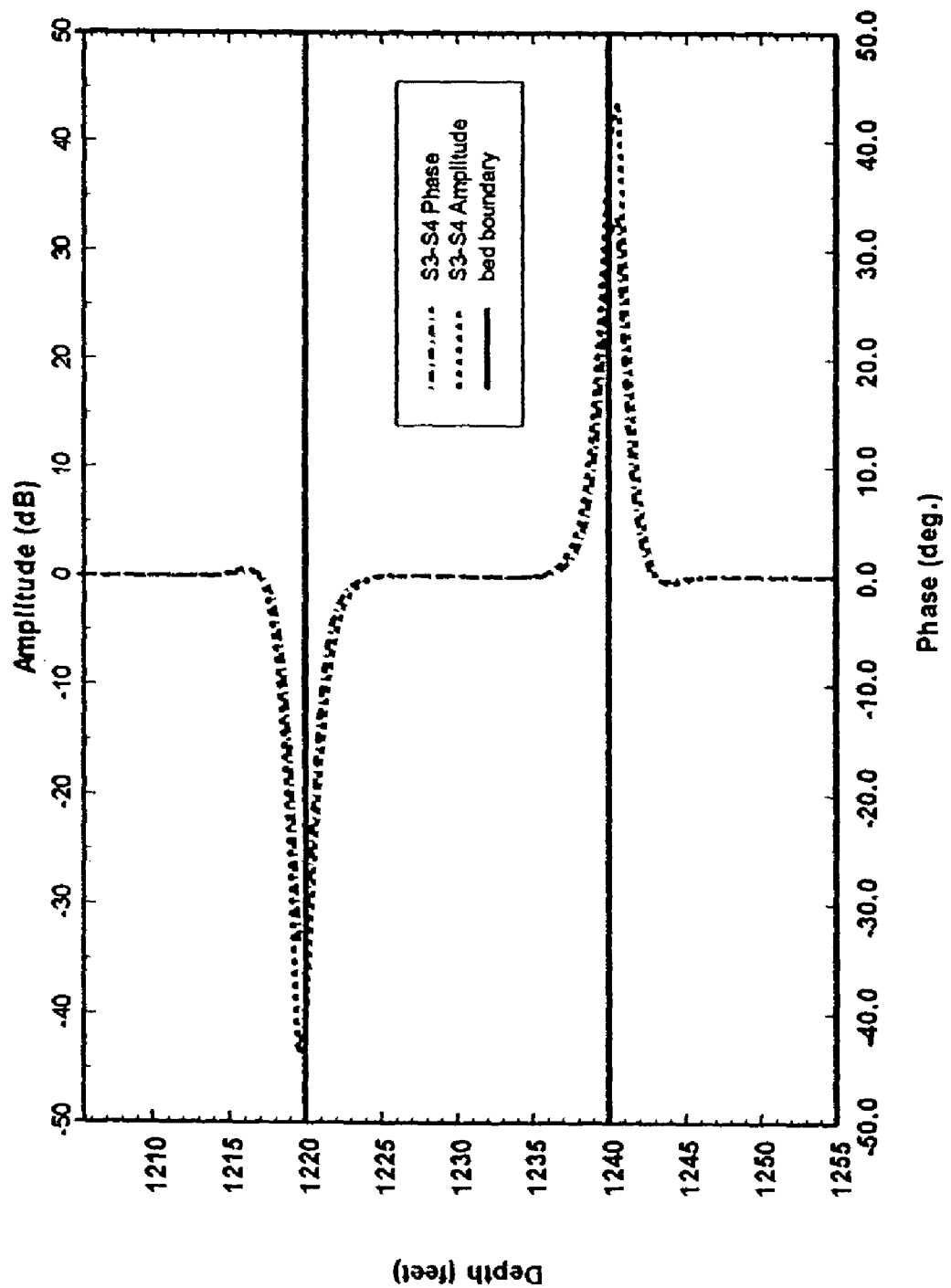
FIG. 25 is a graph showing the differences of the phase and amplitude responses associated with FIGS. 23 and 24.
Figure 26:
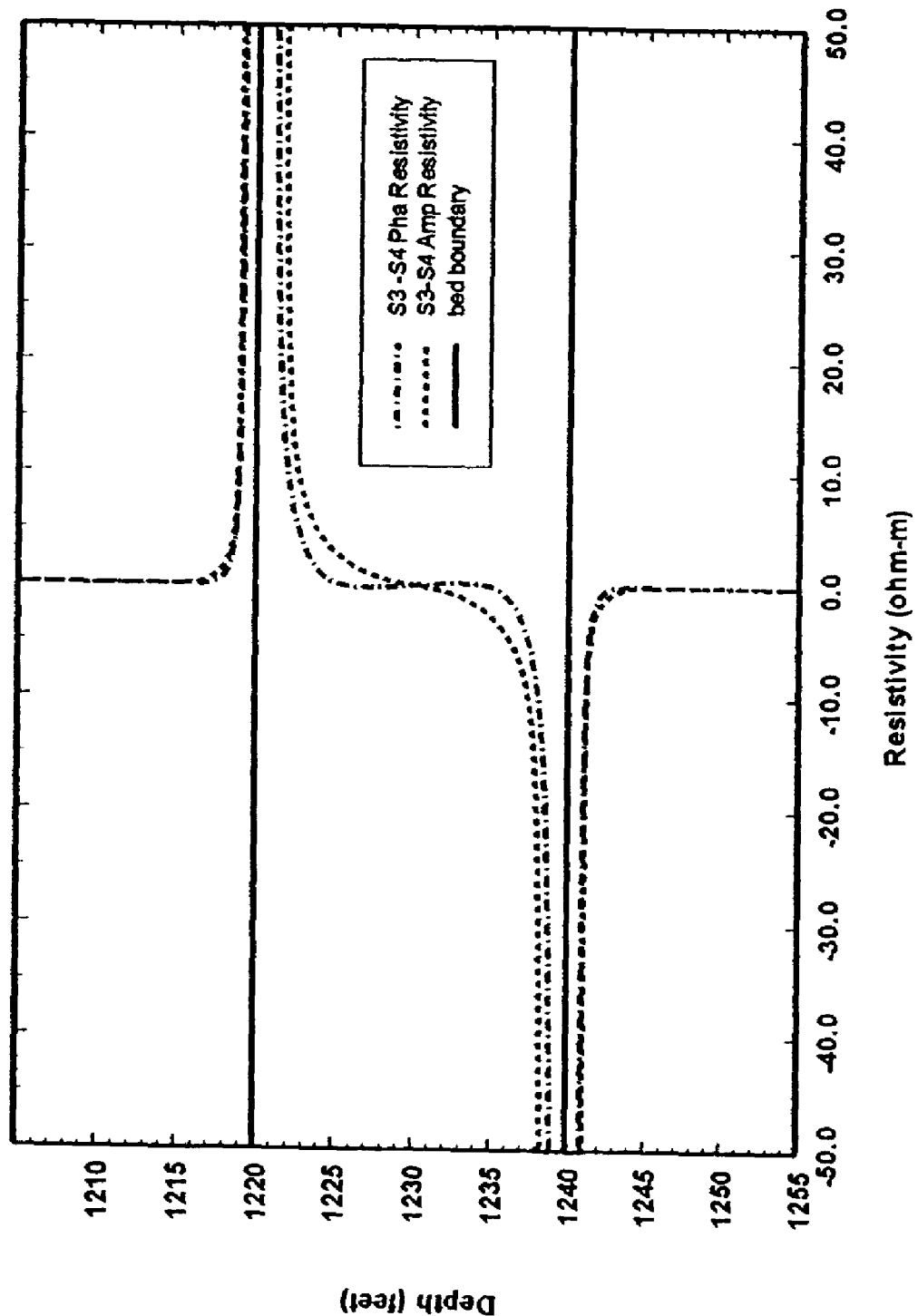
FIG. 26 is a graph showing the differences of the resistivity responses of FIGS. 23 and 24.

In light of the nature of the different responses of the upward and downward looking antenna configurations of tool 140, 150, or 160, such tools may be used to steer the drilling apparatus in order to stay in a desired payzone. Specifically, the difference between the upward and downward looking responses (sometimes referred to herein as the "response difference") indicates whether the tool is approaching a zone of higher or lower resistivity than the present zone. For example, FIG. 26 is a plot of the difference of responses $S_3$ and $S_4$ obtained from tool 150 (FIG. 19) as discussed above. As shown in FIG. 26 (and in light of FIG. 21), if the response difference ($S_3$–$S_4$) is increasingly positive, the response difference indicates that the tool is approaching a zone of higher resistivity (i.e., about to enter a potential payzone). On the other hand, if the response difference ($S_3$–$S_4$) is increasingly negative, the response difference indicates that the tool is approaching a zone of lower resistivity (i.e., about to exit a payzone). Because the spikes (horns) in the plot of the response difference ($S_3$–$S_4$) begin to occur before the tool actually enters the next bed, the drilling operator has the opportunity to change the drilling parameters so that the borehole will remain in the desired payzone. As shown in FIG. 26, either the phase resistivity or the amplitude resistivity may be used for this purpose. Alternatively, as indicated in FIG. 25, the raw phase shift or amplitude attenuation responses (i.e., before conversion into resistivity) may be used rather than resistivity signals. The term "differential signal" is used herein to denote either the raw phase shift/amplitude attenuation responses or the corresponding resistivity signals. Comparing FIGS. 25 and 26, it should be noted that the raw phase shift/amplitude attenuation response difference (FIG. 25) spikes in the opposite direction as the resistivity response difference (FIG. 26).

Figure 27:
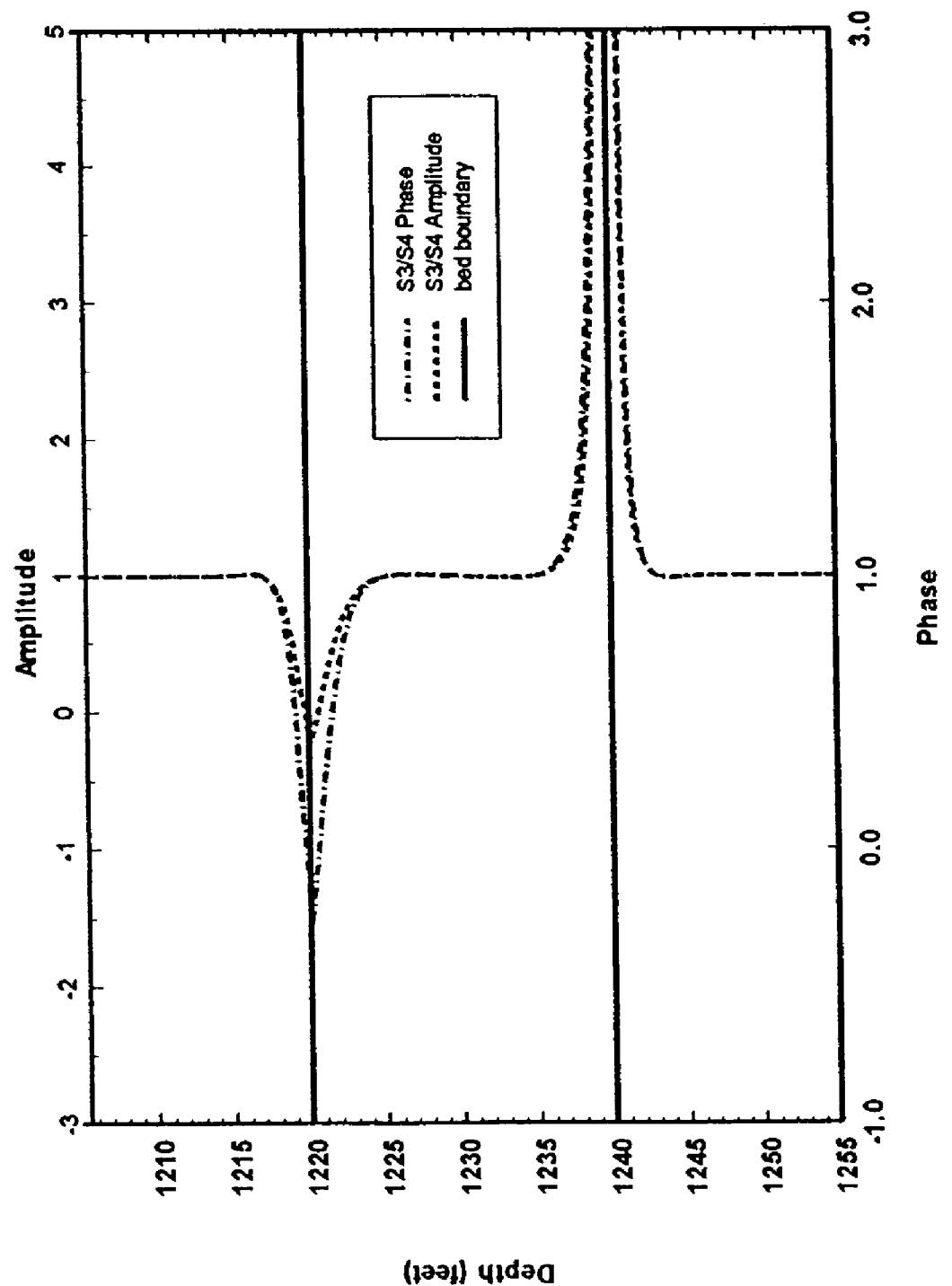
FIG. 27 is a graph showing the ratios of the phase and amplitude responses associated with FIGS. 23 and 24.
Figure 28:
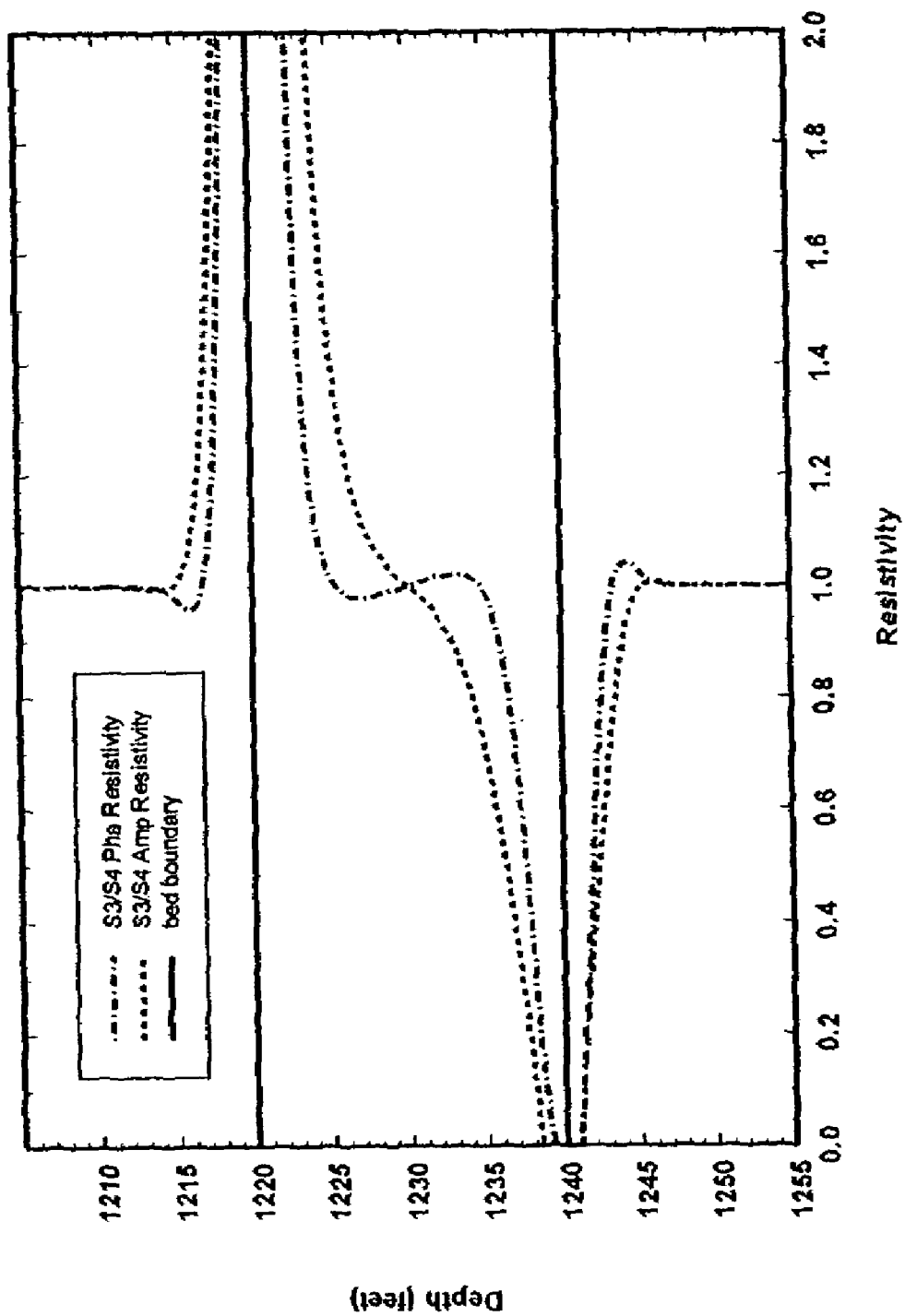
FIG. 28 is a graph showing the ratios of the resistivity responses of FIGS. 23 and 24.

Additionally, instead of the response difference, the ratio of the upward and downward looking responses (sometimes referred to herein as the "response ratio") may be used. For example, FIG. 27 shows response ratio ($S_3/S_4$) using the raw phase shift and amplitude attenuation responses, and FIG. 28 shows response ratio ($S_3/S_4$) after conversion into resistivity. Considering FIG. 28, if the resistivity response ratio ($S_3/S_4$) is increasingly greater than 1.0, the response ratio indicates that the tool is approaching a zone of higher resistivity (i.e., about to enter a potential payzone); if the resistivity response ratio ($S_3/S_4$) is increasingly less than 1.0, the response ratio indicates that the tool is approaching a zone of lower resistivity (i.e., about to exit a payzone). Similarly, considering FIG. 27, if the raw phase shift/amplitude attenuation response ratio ($S_3/S_4$) is increasingly less than 1.0, the response ratio indicates that the tool is approaching a zone of higher resistivity (i.e., about to enter a potential payzone); if the raw phase shift/amplitude attenuation response ratio ($S_3/S_4$) is increasingly greater than 1.0, the response ratio indicates that the tool is approaching a zone of lower resistivity (i.e., about to exit a payzone). Again, because the spikes (horns) in the plot of the response ratio ($S_3/S_4$) begin to occur before the tool actually enters the next bed, the drilling operator has the opportunity to change the drilling parameters so that the borehole will remain in the desired payzone. Generally, the response difference is preferred over the response ratio because taking the ratio of the responses normalizes the data and thereby decreases the resolution. The term "output signal" is used herein to denote either the response difference or the response ratio.

Figure 30:
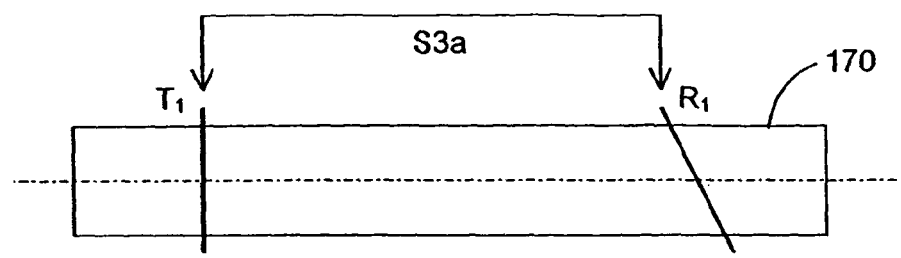
FIG. 30 is a schematic diagram showing another alternative antenna arrangement for a tool in accordance with the present invention.
Figure 31:
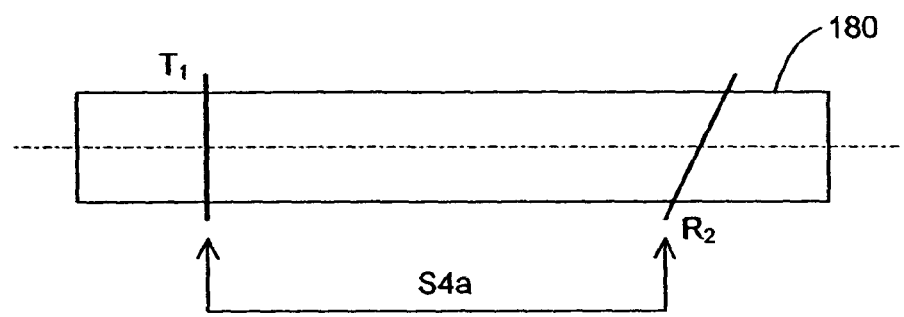
FIG. 31 is a schematic diagram showing yet another alternative antenna arrangement for a tool in accordance with the present invention.
Figure 32:
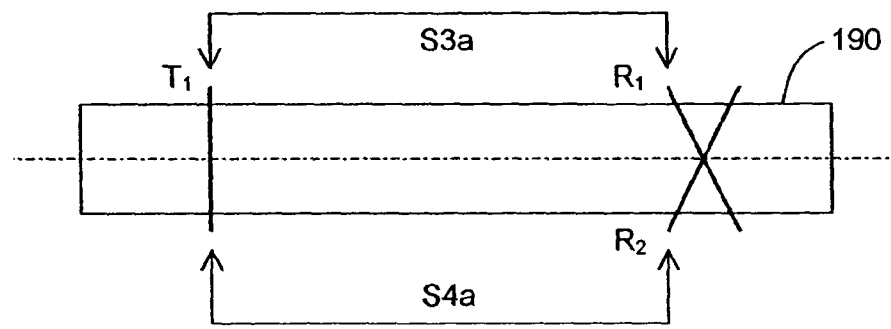
FIG. 32 is a schematic diagram showing still another alternative antenna arrangement for a tool in accordance with the present invention.
Figure 33:
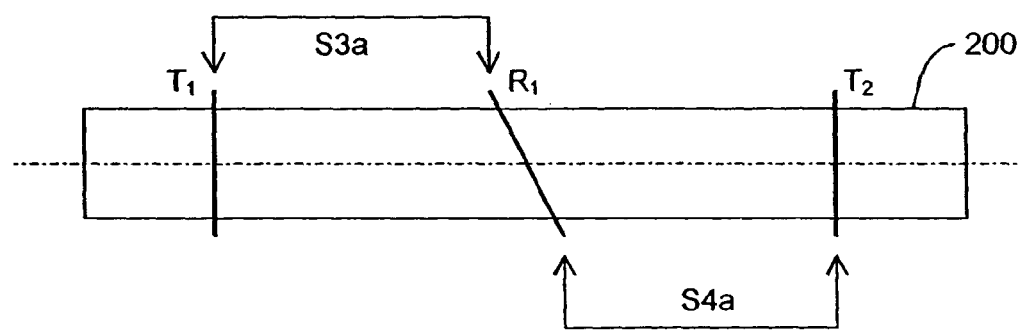
FIG. 33 is a schematic diagram showing still another alternative antenna arrangement for a tool in accordance with the present invention.
Figure 34:
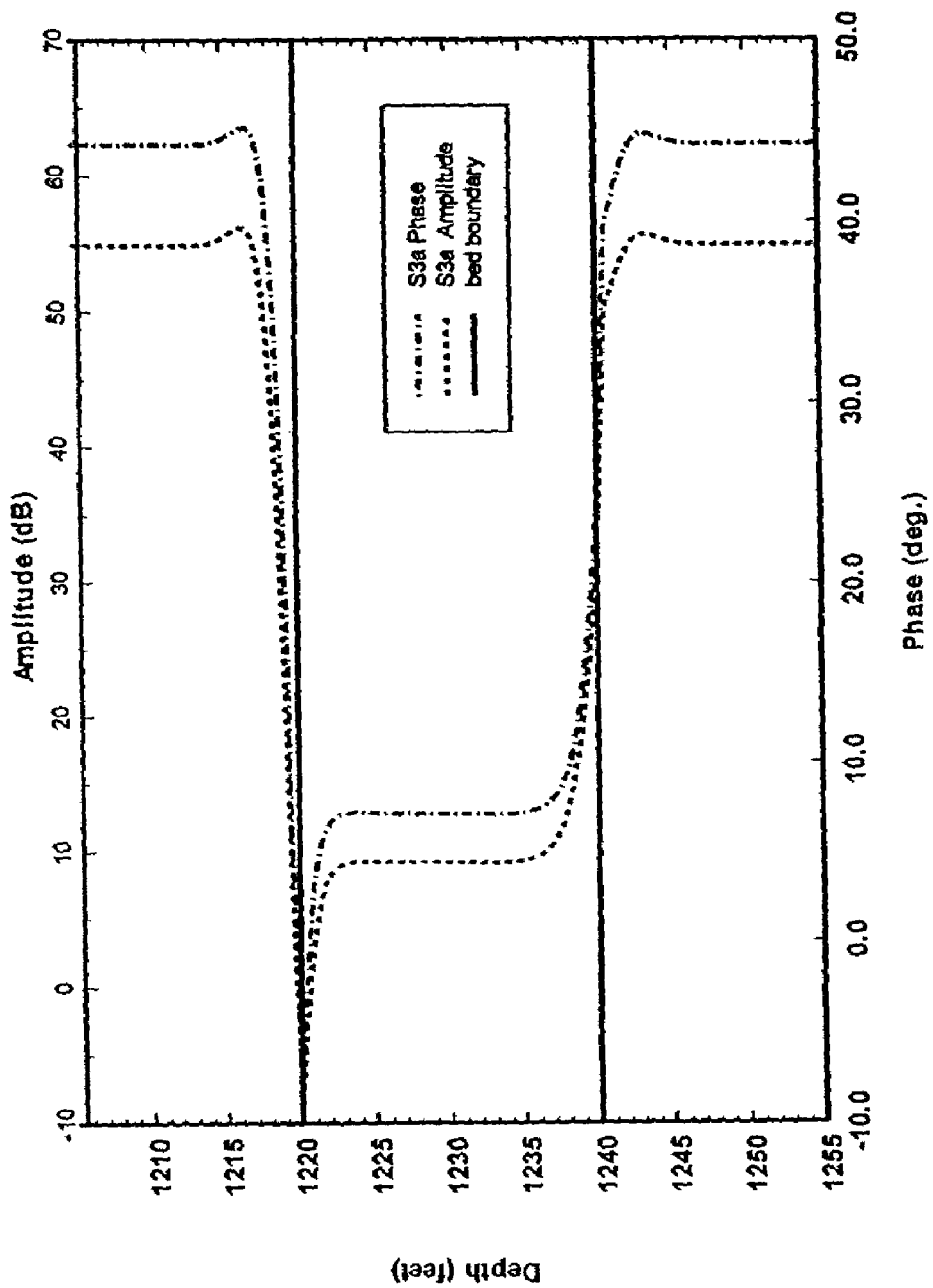
FIG. 34 is a graph showing the phase shift and amplitude attenuation response of receiver $R_1$ of the tool of FIG. 30 as it traverses through the borehole of FIG. 21.
Figure 35:
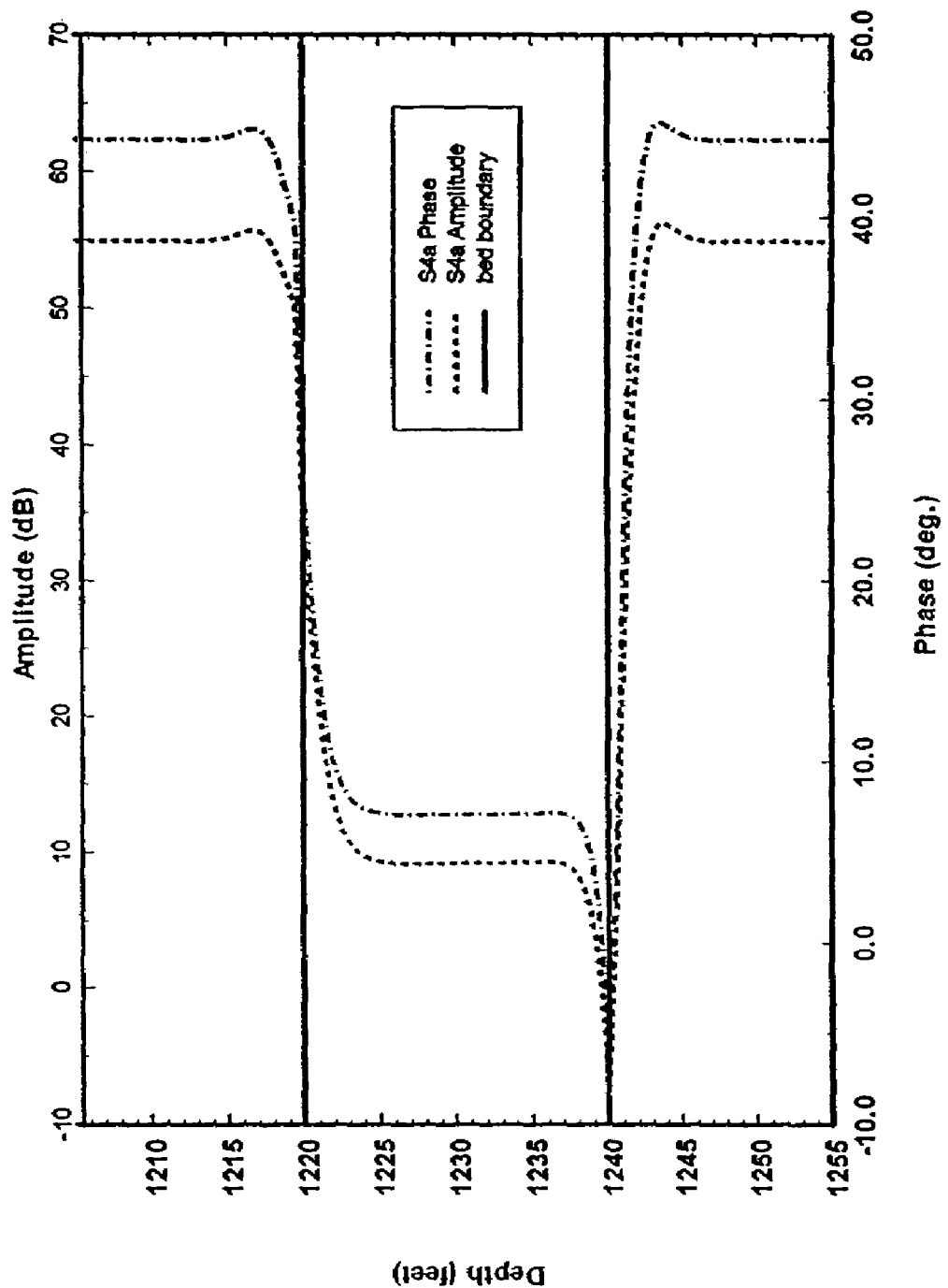
FIG. 35 is a graph showing the phase shift and amplitude attenuation response of receiver $R_2$ of the tool of FIG. 31 as it traverses through the borehole of FIG. 21.
Figure 36:
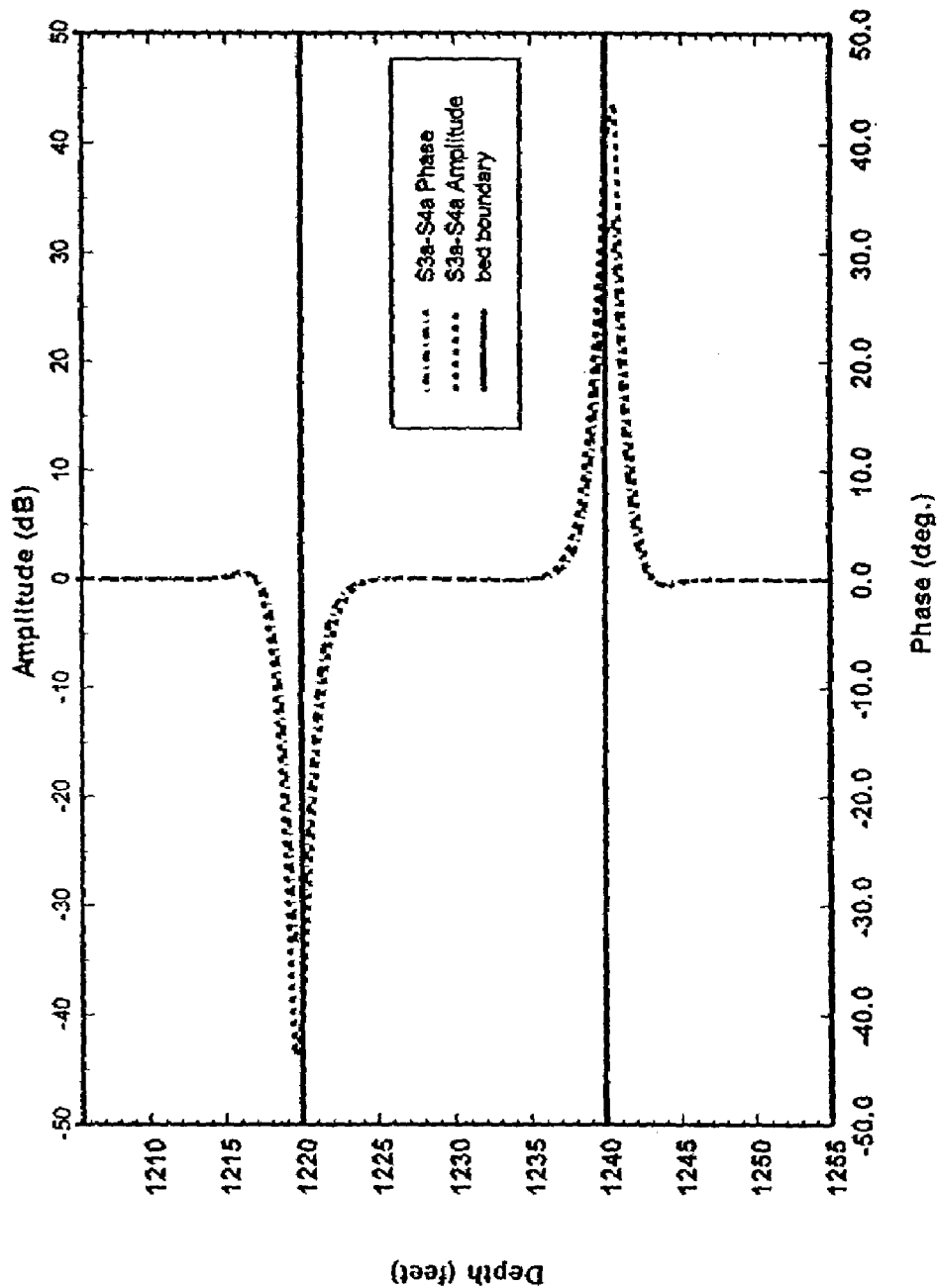
FIG. 36 is a graph showing the differences of the phase and amplitude responses associated with FIGS. 34 and 35.
Figure 37:
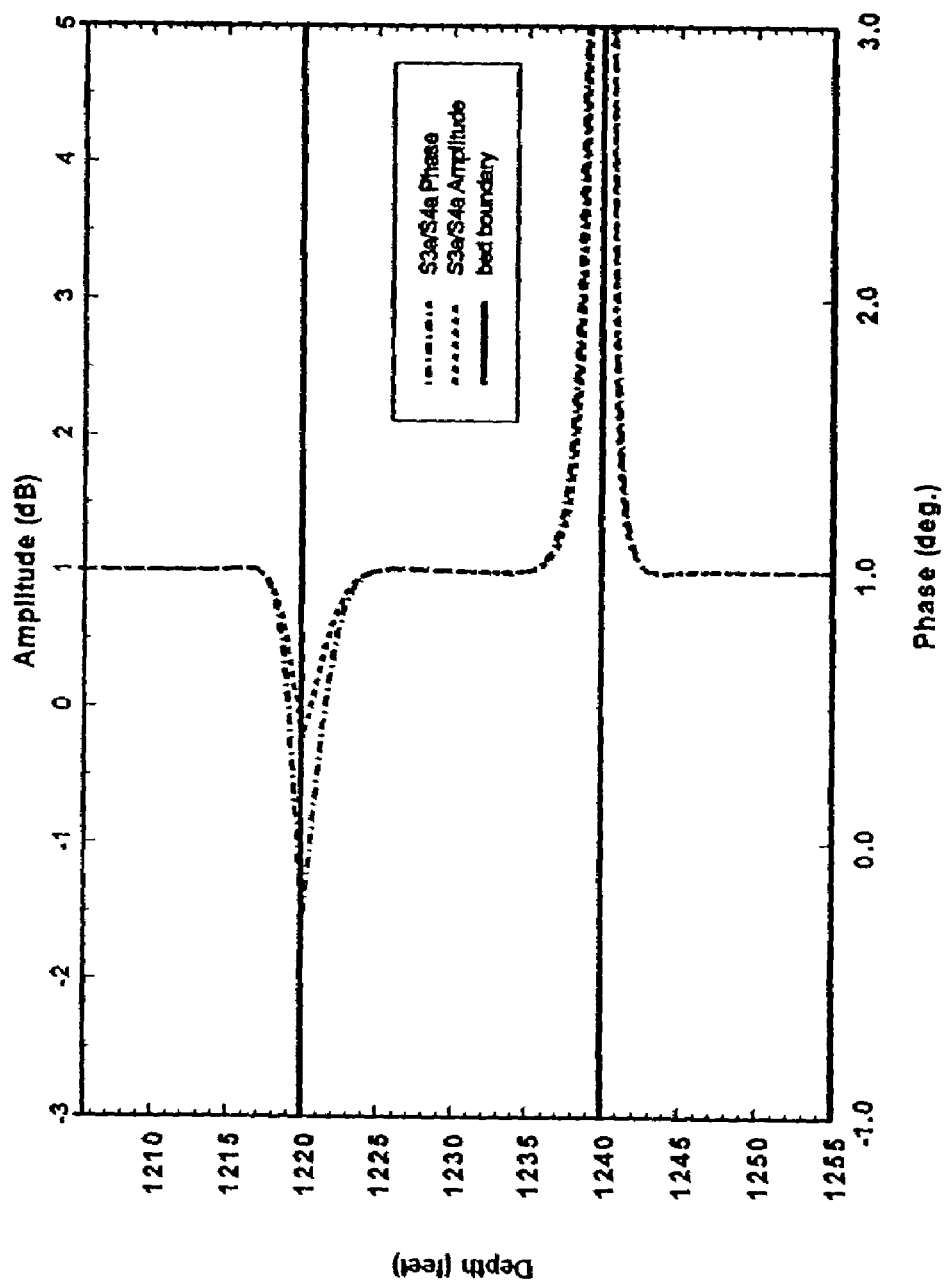
FIG. 37 is a graph showing the ratios of the phase and amplitude responses associated with FIGS. 34 and 35.

As an alternative to the foregoing configurations which involve a pair of receiver antennas, a configuration involving a single receiver antenna may also be used to steer the drill bit in accordance with the present invention. FIG. 30 shows a tool 170 having a single transmitter $T_1$ orthogonal to the tool axis and a single receiver $R_1$ tilted +45° with respect to the tool axis. Instead of measuring the phase difference and amplitude attenuation between a pair of receivers, tool 170 is used to measure the phase difference and amplitude attenuation between the transmitter $T_1$ and the receiver $R_1$. In this context, the term "differential signal" is also used herein to denote the raw phase shift or amplitude attenuation response between a transmitter and a receiver rather than between a pair of receivers. As tool 170 traverses through the borehole of FIG. 21 without rotation, tool 170 produces a response S3a as shown in FIG. 34. Response S3a exhibits a spike as tool 170 approaches and travels across the boundary from bed A to bed B. Similarly, FIG. 31 shows a tool 180 having a single transmitter $T_1$ orthogonal to the tool axis and a single receiver $R_2$ tilted −45° with respect to the tool axis. Again, it will be appreciated that tool 180 is the same as tool 170 rotated 180 degrees about the tool axis. As tool 180 traverses through the borehole of FIG. 21 without rotation, tool 180 produces a response S4a as shown in FIG. 35. Response S4a exhibits a spike as tool 180 approaches and travels across the boundary from bed B to bed C. Both responses S3a and S4a may be acquired by rotating tool 170 or 180 in the borehole, or by using tool 190 as shown in FIG. 32, which has receiver antennas $R_1$ and $R_2$ in a cross-wise configuration, or by using tool 200 as shown in FIG. 33, which has two transmitter antennas $T_1$ and $T_2$ on either side of a receiver antenna $R_1$. By taking the difference (S3a−S4a) or the ratio (S3a/S4a) of the responses, one may produce the plots shown in FIGS. 36 and 37, respectively, which may be used to steer the drill bit. Referring to FIG. 36 in conjunction with FIG. 21, as the response difference (S3a−S4a) becomes negative, it indicates that the tool is approaching a bed of higher resistivity (i.e., about to enter a potential payzone); conversely, as the response difference (S3a−S4a) becomes positive, it indicates that the tool is approaching a bed of lower resistivity (i.e., about to exit a payzone). Similarly, referring to FIG. 37 in conjunction with FIG. 21, as the response ratio (S3a/S4a) becomes less than 1.0, it indicates that the tool is approaching a bed of higher resistivity (i.e., about to enter a potential payzone); conversely, as the response ratio (S3a/S4a) becomes greater than 1.0, it indicates that the tool is approaching a bed of lower resistivity (i.e., about to exit a payzone).

Figure 29:
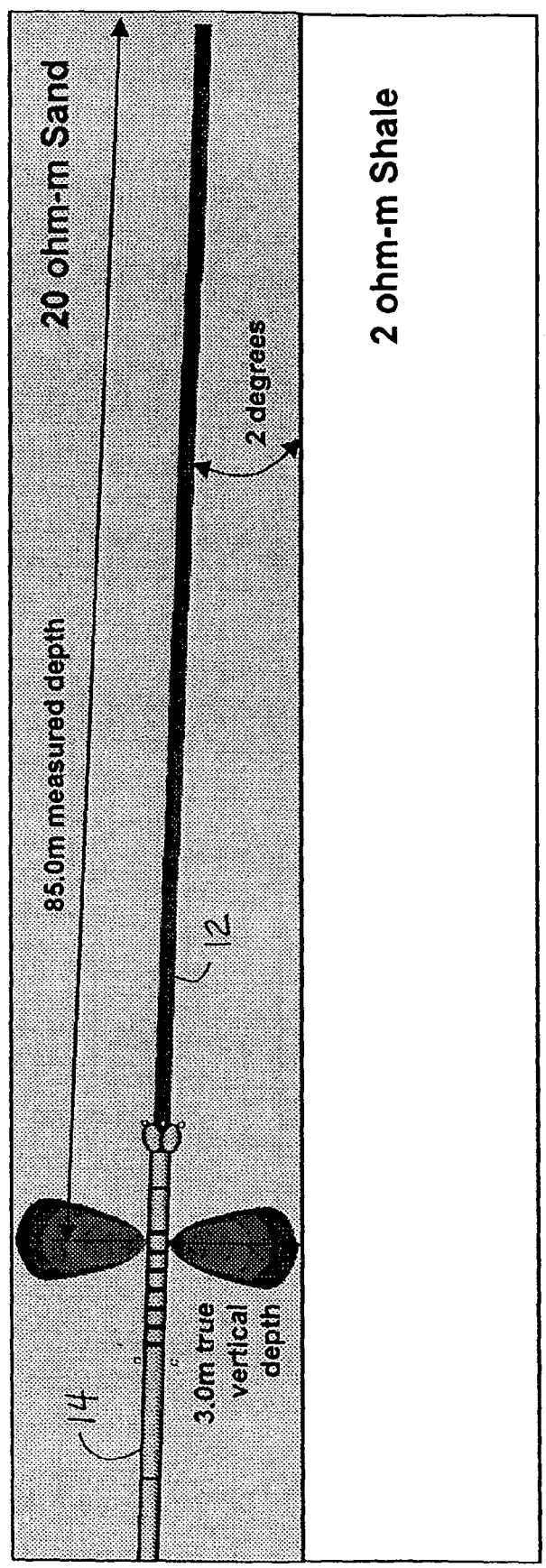
FIG. 29 is a schematic diagram illustrating a resistivity tool approaching a boundary between two beds.

Although Luling (U.S. Pat. No. 5,241,273) defined the term "horn" to mean "a sharp local maximum with a peak resistivity at least twice the resistivity on either side of the local maximum," the present invention does not require such a dramatic change in resistivity for the purpose of geosteering. Rather, as illustrated in FIGS. 25–28 and 35–36, the present invention is sensitive to the difference or ratio of the responses of the downward looking and upward looking antennas. The ability of the present invention to provide an advance indication of a bed boundary during horizontal drilling is illustrated in FIG. 29. For a typical resistivity tool, the antennas have a sensitive zone of about 3.0 meters radially from the tool axis. Thus, if the tool is drilling through a payzone and approaching a bed boundary at an angle of attack of about 2 degrees, the drilling operator will have about 85 meters of borehole depth in which to steer away from the bed boundary in order to stay in the desired payzone. As with the other examples in this disclosure, the foregoing example is for illustrative purposes only and should not be considered limiting for the present invention.

If a resistivity tool in accordance with the present invention is rotating, the upward and downward responses will vary sinusoidally. In a rotating mode of operation, tool 120 of FIG. 16 (or tool 130 of FIG. 17), for example, generates both the upward and downward responses. Accordingly, as shown in FIG. 2, a preferred embodiment of this invention contains at least one rotational position indicator 70, such as an accelerometer or magnetometer, which also has a sinusoidal output. By correlating the upward and downward responses with the output of the rotational position indicator(s) 70, the orientation of the tool may be calculated according to methods well known in the art. The at least one rotational position indicator 70 preferably comprises magnetometers, inclinometers, or accelerometers; however, other sensor types, such as gyroscopes, may also be used. The function of the at least one rotational position indicator 70 is to provide a sinusoidal electrical signal as the tool rotates that indicates the rotational orientation of the tool with respect to a reference direction, such as the direction of gravity or magnetic north. A gravitational sensor (such as an inclinometer or accelerometer) does not function satisfactorily when the axis of the tool is aligned with the gravitational direction (i.e., in a vertical orientation), and a magnetic sensor (such as a magnetometer) does not function satisfactorily when the axis of the tool is aligned with the magnetic north direction. Therefore, the tool preferably contains at least one gravitational sensor (e.g., an accelerometer) and at least one magnetic sensor (e.g. a magnetometer) so that the orientation of the tool is ascertainable in any position.

More preferably, rotational position indicator 70 may contain both a 3-axis fluxgate magnetometer and a 3-axis accelerometer. As is known in the art, the combination of those two sensor systems enables the measurement of the toolface, inclination, and azimuth orientation angles of the borehole. The toolface and hole inclination angles are calculated from the accelerometer sensor output. The magnetometer sensor outputs are used to calculate the hole azimuth. With the toolface, the hole inclination, and the hole azimuth information, a tool in accordance with the present invention can be used to steer the bit to the desirable bed. Specifically, the response difference or the response ratio can be used effectively to enter a desired payzone or to stay within the payzone of interest.

The exemplary responses shown in FIGS. 22–28 are for 2-MHz tools with 24/30 antenna spacings. However, persons reasonably skilled in the art will recognize that other frequencies and antenna spacings could be used. Additionally, although the illustrative examples provided herein comprise antenna tilt angles of +45° and −45°, other tilt angles could be used.

Although the foregoing specific details describe a preferred embodiment of this invention, persons reasonably skilled in the art of petroleum well drilling and logging will recognize that various changes may be made in the details of the method and apparatus of this invention without departing from the spirit and scope of the invention as defined in the appended claims. Therefore, it should be understood that this invention is not to be limited to the specific details shown and described herein.

I claim:

1. A method for steering a downhole drilling apparatus, the method comprising:
    inducing a first electromagnetic wave in a formation using a first transmitter antenna oriented at a first angle relative to a tool axis;
    determining a first differential signal based on responses to the first electromagnetic wave by a first receiver antenna and a second receiver antenna, the receiver antennas each being oriented relative to the tool axis at an angle different than the first angle;
    inducing a second electromagnetic in said formation using a second transmitter antenna;
    determining a second differential signal based on responses to the second electromagnetic wave by the first and second receiver antennas;
    obtaining an output signal from the first and second differential signals, wherein the output signal comprises a difference of said first and second differential signals or a ratio of said first and second differential signals; and
    adjusting a drilling direction of said drilling apparatus based at least in part on said output signal.

2. The method of claim 1 wherein:
    said first differential signal comprises the phase difference between said first and second response signals; and
    said second differential signal comprises the phase difference between said third and fourth response signals.

3. The method of claim 1 wherein:
    said first differential signal comprises the amplitude ratio of said first and second response signals; and
    said second differential signal comprises the amplitude ratio of said third and fourth response signals.

4. The method of claim 1 wherein:
    said first differential signal comprises a phase shift resistivity value based on the phase difference between said first and second response signals; and
    said second differential signal comprises a phase shift resistivity value based on the phase difference between said third and fourth response signals.

5. The method of claim 1 wherein:
    said first differential signal comprises an amplitude attenuation resistivity value based on the amplitude ratio of said first and second response signals; and
    said second differential signal comprises an amplitude attenuation resistivity value based on the amplitude ratio of said third and fourth response signals.

6. The method of claim 1 wherein said output signal comprises the difference of said first and second differential signals.

7. The method of claim 1, wherein said output signal comprises the ratio of said first and second differential signals.

8. A tool for steering a downhole drilling apparatus, the tool comprising:
    a first transmitter antenna oriented at a first angle relative to a tool axis to transmit a first electromagnetic signal into a surrounding formation;
    a second transmitter antenna spaced apart from said first transmitter antenna along the tool axis to transmit a second electromagnetic signal into the surrounding formation;
    a first receiver antenna oriented at a second angle relative to said tool axis, said second angle being different from said first angle;
    a second receiver antenna spaced apart from said first receiver antenna along said tool axis; and
    a processor in communication with said first and second receiver antennas to determine a first differential signal response to the first electromagnetic signal and a second differential signal response to the second electromagnetic signal, wherein the processor determines an output signal from the first and second differential signals for use in steering the downhole drilling apparatus.

9. The tool of claim 8 wherein:
    said first differential signal comprises the phase difference between response signals of the first and second receiver antennas; and
    said second differential signal also comprises the phase difference between response signals of the first and second receiver antennas.

10. The tool of claim 8 wherein:
    said first differential signal comprises the amplitude ratio between response signals of the fist and second receiver antennas; and
    said second differential signal comprises the amplitude ratio between response signals of the first and second receiver antennas.

11. The tool of claim 8 wherein:
    said first differential signal comprises a phase shift resistivity value based on the phase difference between response signals of the first and second receiver antennas; and
    said second differential signal comprises a phase shift resistivity value based on the phase difference between response signals of the first and second receiver antennas.

12. The tool of claim 8 wherein:
    said first differential signal comprises an amplitude attenuation resistivity value based on the amplitude ratio between response signals of the first and second receiver antennas; and
    said second differential signal comprises an amplitude attenuation resistivity value based on the amplitude ratio between response signals of the first and second receiver antennas.

13. The tool of claim 8 wherein said output signal comprises the difference of said first and second differential signals.

14. The tool of claim 8, wherein said output signal comprises the ratio of said first and second differential signals.

* * * * *